US 12,302,269 B2

United States Patent
Grant et al.

(10) Patent No.: US 12,302,269 B2
(45) Date of Patent: May 13, 2025

(54) ENHANCED CELL GLOBAL IDENTIFIER REPORTING

(71) Applicant: TELEFONAKTIEBOLAGET L M ERICSSON (PUBL), Stockholm (SE)

(72) Inventors: Stephen Grant, Pleasanton, CA (US); Peter Alriksson, Hörby (SE); Emma Wittenmark, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 84 days.

(21) Appl. No.: 17/766,782

(22) PCT Filed: Oct. 6, 2020

(86) PCT No.: PCT/IB2020/059394
§ 371 (c)(1),
(2) Date: Apr. 6, 2022

(87) PCT Pub. No.: WO2021/070065
PCT Pub. Date: Apr. 15, 2021

(65) Prior Publication Data
US 2024/0064669 A1 Feb. 22, 2024

Related U.S. Application Data

(60) Provisional application No. 62/912,041, filed on Oct. 7, 2019.

(51) Int. Cl.
*H04W 56/00* (2009.01)
*H04W 72/0453* (2023.01)

(52) U.S. Cl.
CPC ... *H04W 56/0015* (2013.01); *H04W 72/0453* (2013.01)

(58) Field of Classification Search
CPC ......... H04W 56/0015; H04W 72/0453; H04W 24/10; H04W 36/0058; H04W 72/0473;
(Continued)

(56) References Cited

U.S. PATENT DOCUMENTS

2019/0132170 A1* 5/2019 Si ..................... H04L 5/0007
2019/0207737 A1* 7/2019 Babaei ............... H04L 27/2607
(Continued)

FOREIGN PATENT DOCUMENTS

CN       111345057 A   *  6/2020  ............ H04W 24/02
KR    20200067907 A   *  6/2020

OTHER PUBLICATIONS

AT&T, Deutsche Telekom, NTT DOCOMO, T-Mobile USA, RMSI Transmission on SCell, R1-1911241,3GPP TSG RAN WG1 #98bis Chongqing, China, Oct. 14-20, 2019 (Year: 2019).*
(Continued)

*Primary Examiner* — Ayaz R Sheikh
*Assistant Examiner* — Louis Samara
(74) *Attorney, Agent, or Firm* — Sage Patent Group

(57) ABSTRACT

Embodiments include methods implemented in a wireless device for reporting of a cell global identifier (CGI) in a wireless network. In one embodiment, a method comprises receiving a synchronization signal/physical broadcast channel (SS/PBCH) block from a network node; locating a control resource set (CORESET) configured by the network node through determining a frequency position of the CORESET based on a value received from the network node through radio resource control signaling; and determining and reporting the CGI to the network node based on the located CORESET. In another embodiment, the CORESET is located through testing a set of one or more reference frequency candidates from which a frequency position of the CORESET is determined.

28 Claims, 24 Drawing Sheets

(58) Field of Classification Search
CPC ... H04W 24/08; H04L 27/2666; H04B 7/0617
See application file for complete search history.

(56) References Cited

U.S. PATENT DOCUMENTS

| | | | | |
|---|---|---|---|---|
| 2019/0223163 | A1* | 7/2019 | Ko | H04W 72/23 |
| 2019/0261281 | A1* | 8/2019 | Jung | H04W 72/0473 |
| 2020/0344097 | A1* | 10/2020 | Si | H04W 72/0453 |
| 2021/0120481 | A1* | 4/2021 | Cheng | H04W 24/02 |
| 2021/0211899 | A1* | 7/2021 | Koziol | H04W 24/10 |
| 2021/0219160 | A1* | 7/2021 | Xie | H04W 24/08 |

OTHER PUBLICATIONS

Ericsson, "Initial access signals and channels", 3GPP TSG-RAN WG1 Meeting #98bis, R1-1910944, Chongqing, China, Oct. 14-20, 2019. (Year: 2019).*

3GPP TS 38.213 V15.1.0 (Mar. 2018), 3rd Generation Partnership Project; Technical Specification Group Radio Access Networks; NR; Physical layer procedures for control (release 15) (Year: 2018).*

AT&T, Deutsche Telekom, NTT DOCOMO, T-Mobile USA, RMSI Transmission on SCell, R1-1911241,3GPP TSG RAN WG1 #98bis Chongqing, China, Oct. 14-20, 2019.

Ericsson, "Initial access signals and channels", 3GPP TSG-RAN WG1 Meeting #98bis, R1-1910944, Chongqing, China, Oct. 14-20, 2019.

QUALCOMM Incorporated, Initial Access Signals and Channels for NR-U, R1-1911094, 3GPPTSG RAN WGI Meeting #98bis Chongqing, CN Oct. 14-20, 2019.

* cited by examiner

```
-- ASN1START
-- TAG-REPORTCONFIGNR-START

ReportConfigNR ::=       SEQUENCE {                                    1102
    reportType           CHOICE {
        periodical           PeriodicalReportConfig,
        eventTriggered       EventTriggerConfig,
        ...,
        reportCGI            ReportCGI,
        [[
        reportSFTD           ReportSFTD-NR
        ]]
    }
}

ReportCGI ::=            SEQUENCE {
    cellForWhichToReportCGI  PhysCellId,
    ...,
    referenceFrequency       ARFCN-ValueNR OPTIONAL,  ⌡ 1150
}
```
⌠ 1152

FIG. 11

*referenceFrequency*
This field indicates a reference frequency for determination of the frequency position of CORESET0, where the frequency corresponds to an NR ARFCN value

ENHANCED CELL GLOBAL IDENTIFIER REPORTING

CROSS-REFERENCE TO RELATED APPLICATIONS

This application is a 371 of International Application No. PCT/IB2020/059394, filed Oct. 6, 2020, which claims the benefit of U.S. Provisional Application No. 62/912,041, filed Oct. 7, 2019, the disclosures of which are fully incorporated herein by reference.

TECHNICAL FIELD

Embodiments of the invention relate to the field of wireless network; and more specifically, to the enhancement of cell global identifier reporting.

BACKGROUND ART

Mobile broadband will continue to drive the demands for big overall traffic capacity and huge achievable end-user data rates in the wireless access network. Several scenarios in the future will require data rates of up to 10 Gbps in local areas. These demands for very high system capacity and very high end-user date rates can be met by networks with distances between access nodes ranging from a few meters in indoor deployments up to roughly 50 m in outdoor deployments, i.e., with an infra-structure density considerably higher than the densest networks of today. In Rel-15 3GPP standardized the new radio (NR) system to support the above. Besides traditional licensed exclusive bands, NR systems will also be operating on unlicensed bands. This is standardized in Rel-16.

In a NR system, a wireless device such as a User Equipment (UE) may be configured to measure on the neighbor cell's synchronization signal/physical broadcast channel (SS/PBCH) block indicated in its measurement configuration, and report the identified cell global identifier (CGI) to its serving cell (e.g., a next generation nodeB (gNB)). Yet as known in the art, the relative frequency positions of (1) the SS/PBCH block and (2) control resource set 0 (CORESET0) through which the wireless device reads the CGI are determined based on values of two parameters ($k_{SSB}$ and K as explained in more details below) received from the serving cell. The rigid correlation of the relative frequency positions between the SS/PBCH block and CORESET0 may result in transmission collision of SS/PBCH blocks between operators, particularly in the unlicensed spectrum, and lead to degraded synchronization performance and other issues.

SUMMARY

Embodiments include methods implemented in a wireless device for reporting of a cell global identifier (CGI) in a wireless network. In one embodiment, a method comprises receiving a synchronization signal/physical broadcast channel (SS/PBCH) block from a network node; locating a control resource set (CORESET) configured by the network node through determining a frequency position of the CORESET based on a value received from the network node through radio resource control signaling; and determining and reporting the CGI to the network node based on the located CORESET. In another embodiment, a method comprises receiving a synchronization signal/physical broadcast channel (SS/PBCH) block from a network node; locating a control resource set (CORESET) configured by the network node through testing a set of one or more reference frequency candidates from which a frequency position of the CORESET is determined; and determining and reporting the CGI to the network node based on the located CORESET.

Embodiments include wireless devices to report a cell global identifier (CGI) in a wireless network. In one embodiment, a wireless device comprises processing circuitry and device readable medium coupled to the processing circuitry, where the device readable medium stores instructions, which when executed, are capable of causing the wireless device to perform the following: receiving a synchronization signal/physical broadcast channel (SS/PBCH) block from a network node; locating a control resource set (CORESET) configured by the network node through determining a frequency position of the CORESET based on a value received from the network node through radio resource control signaling; and determining and reporting the CGI to the network node based on the located CORESET. In another embodiment, a wireless device comprises processing circuitry and device readable medium coupled to the processing circuitry, where the device readable medium stores instructions, which when executed, are capable of causing the wireless device to perform the following: receiving a synchronization signal/physical broadcast channel (SS/PBCH) block from a network node; locating a control resource set (CORESET) configured by the network node through testing a set of one or more reference frequency candidates from which a frequency position of the CORESET is determined; and determining and reporting the CGI to the network node based on the located CORESET.

Embodiments include device readable media storing instructions, which when executed, are capable of causing a wireless device to perform methods for reporting of a cell global identifier (CGI) in a wireless network. In one embodiment, a method comprises receiving a synchronization signal/physical broadcast channel (SS/PBCH) block from a network node; locating a control resource set (CORESET) configured by the network node through determining a frequency position of the CORESET based on a value received from the network node through radio resource control signaling; and determining and reporting the CGI to the network node based on the located CORESET. In another embodiment, a method comprises receiving a synchronization signal/physical broadcast channel (SS/PBCH) block from a network node; locating a control resource set (CORESET) configured by the network node through testing a set of one or more reference frequency candidates from which a frequency position of the CORESET is determined; and determining and reporting the CGI to the network node based on the located CORESET.

These embodiments increase flexibility in the frequency domain position of the SS/PBCH block transmission thus avoid SS/PBCH block collisions between operators, particularly in an unlicensed spectrum.

BRIEF DESCRIPTION OF THE DRAWINGS

The invention may best be understood by referring to the following description and accompanying drawings that are used to illustrate embodiments of the invention. In the drawings:

FIG. 11 illustrates the configuration of the reference frequency within the report configuration information element per some embodiments of the invention.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some General Properties of 5G/NR

Figure 1:
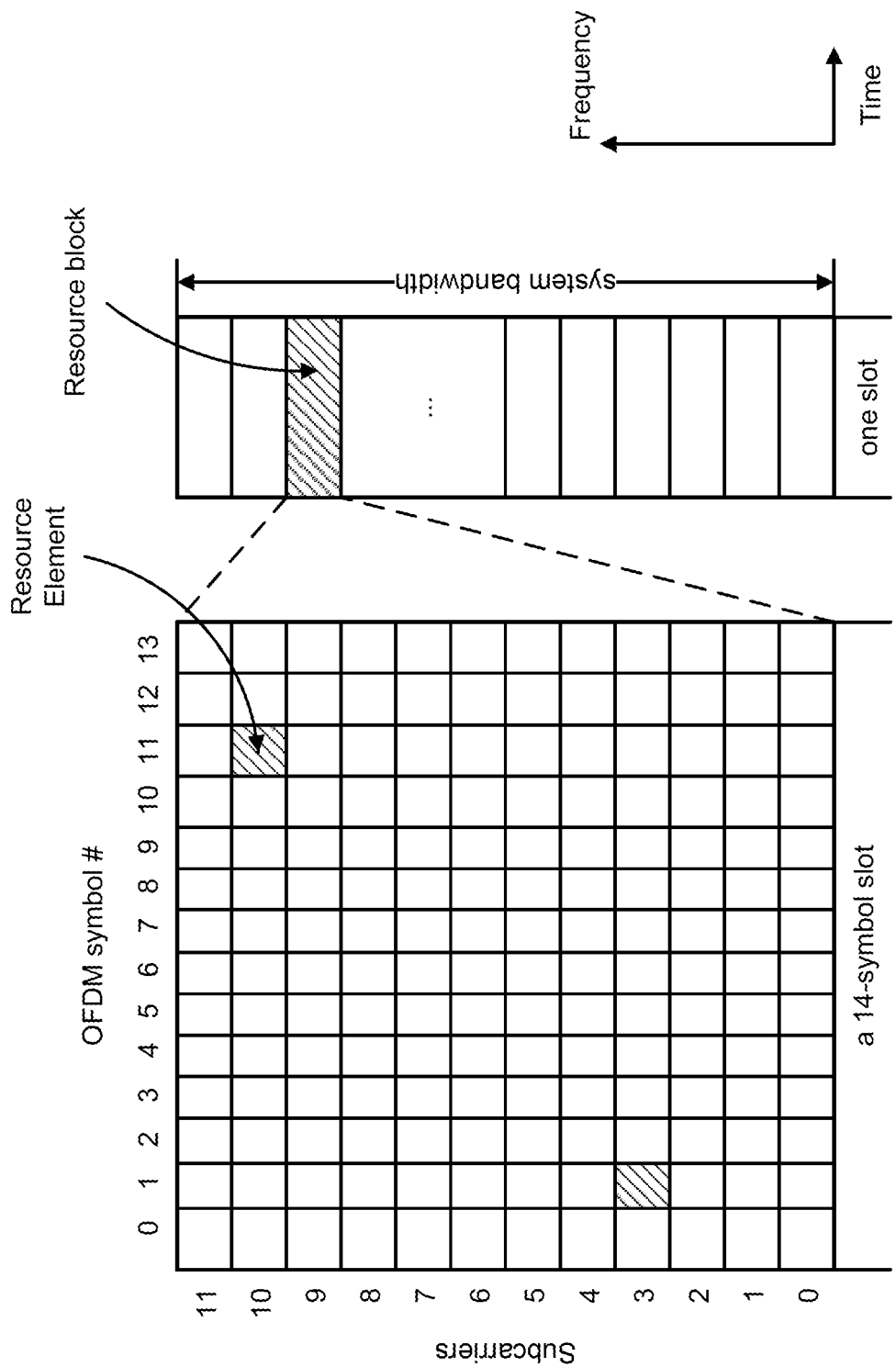
FIG. 1 illustrates the basic New Radio (NR) physical resource grid corresponding to a particular antenna port.

Similar to Long-Term Evolution (LTE), New Radio (NR) uses OFDM (Orthogonal Frequency Division Multiplexing) in the downlink (i.e., from a network node, gNB, eNB, or base station, to a user equipment or UE). The basic NR physical resource over an antenna port can thus be seen as a time-frequency grid as illustrated in FIG. 1, where a resource block (RB) in a 14-symbol slot is shown. A resource block corresponds to 12 contiguous subcarriers in the frequency domain. Resource blocks are numbered in the frequency domain, starting with 0 from one end of the system bandwidth. Each resource element corresponds to one OFDM subcarrier during one OFDM symbol interval.

Different subcarrier spacing values are supported in NR. The supported subcarrier spacing values (also referred to as different numerologies) are given by $\Delta f=(15\times 2^{\alpha})$ kHz where $\alpha \in (0, 1, 2, 3, 4)$. $\Delta f=15$ kHz is the basic (or reference) subcarrier spacing that is also used in LTE.

In the time domain, downlink and uplink transmissions in NR are organized into equally sized subframes of 1 ms each similar to LTE. A subframe is further divided into multiple slots of equal duration. The slot length for subcarrier spacing $\Delta f=(15\times 2^{\alpha})$ kHz is $\frac{1}{2}^{\alpha}$ ms. There is only one slot per subframe at $\Delta f=15$ kHz and a slot consists of 14 OFDM symbols in one embodiment.

Downlink transmissions are dynamically scheduled, i.e., in each slot the gNB transmits downlink control information (DCI) about which UE data is to be transmitted to and which resource blocks in the current downlink slot the data is transmitted on. This control information is typically transmitted in the first one or two OFDM symbols in each slot in NR. The control information is carried on the Physical Control Channel (PDCCH) and data is carried on the Physical Downlink Shared Channel (PDSCH). A UE first detects and decodes PDCCH and if a PDCCH is decoded successfully, it then decodes the corresponding PDSCH based on the decoded control information in the PDCCH.

In addition to PDCCH and PDSCH, there are also other channels and reference signals transmitted in the downlink.

Uplink data transmissions, carried on Physical Uplink Shared Channel (PUSCH), are also dynamically scheduled by the gNB by transmitting a DCI. In case of TDD operation, the DCI (which is transmitted in the downlink (DL) region) always indicates a scheduling offset so that the PUSCH is transmitted in a slot in the uplink (UL) region.

NR in Unlicensed Spectrum

For LTE, 3GPP has specified a standard for LTE based communication in unlicensed spectrum, i.e., co-existing with other systems, such as Wi-Fi. For LTE this is enabled only in tight interworking (carrier aggregation) with a system using licensed spectrum (i.e., regular LTE). The LTE based communication in unlicensed spectrum in this manner is labeled License-Assisted Access (LAA). 3GPP continues its venture into the realm of unlicensed spectrum for NR and for NR, such a system is denoted NR Unlicensed (NR-U). NR-U is specified both for tight interworking (e.g., dual connectivity) with a regular NR system and as a stand-alone system. The coexistence with other systems (and other NR-U systems/cells) in unlicensed spectrum requires a different kind of operation on the physical layer than in regular NR in licensed spectrum, including e.g., the Listen Before Talk (LBT) principle (e.g., using Clear Channel Assessment (CCA)), where a gNB or UE listens to the radio channel to verify that it is clear (unused) before accessing the medium for transmission (more about this below). The essentially uncoordinated operation of different systems in unlicensed spectrum also makes it more prone to destructive interference.

For a node (e.g., NR-U gNB/UE, LTE-LAA eNB/UE, or Wi-Fi AP/STA)) to be allowed to transmit in unlicensed spectrum (e.g., 5 GHz band) it typically needs to perform a clear channel assessment (CCA). This procedure typically includes sensing the medium to be idle for a number of time intervals. Sensing the medium to be idle can be done in different ways, e.g., using energy detection, preamble detection or using virtual carrier sensing, where the latter implies that the node reads control information from other transmitting nodes informing when a transmission will end. After sensing the medium to be idle, the node is typically allowed to transmit for a certain amount of time, sometimes referred to as transmission opportunity (TXOP). The length of the TXOP depends on regulation and type of CCA that has been performed, but typically ranges from 1 ms to 10 ms. This duration is often referred to as a COT (Channel Occupancy Time).

In Wi-Fi, feedback of data reception acknowledgements (ACKs) is transmitted without performing clear channel assessment. Preceding feedback transmission, a small-time duration (called Short Interframe Space, SIFS) is introduced between the data transmission and the corresponding feedback, which does not include actual sensing of the channel. In IEEE 802.11, the SIFS period (16 µs for 5 GHz OFDM PHYs) is defined as:

$$aSIFSTime = aRxPHYDelay + aMACProcessingDelay + aRxTxTurnaroundTime$$

aRxPHYDelay defines the duration needed by the PHY layer to deliver a packet to the MAC layer aMACProcessingDelay defines the duration that the MAC layer needs to trigger the PHY layer transmitting a response aRxTxTurnaroundTime defines the duration needed to turn the radio from reception into transmit mode Therefore, the SIFS duration is used to accommodate for the hardware delay to switch the direction from reception to transmission.

It is anticipated that for NR in unlicensed bands (NR-U), a similar gap to accommodate for the radio turnaround time will be allowed. For example, this will enable the transmission of PUCCH carrying UCI feedback as well as PUSCH carrying data and possible UCI within the same transmit opportunity (TXOP) acquired by the initiating gNB without the UE performing clear channel assessment before PUSCH/PUCCH transmission as long as the gap between DL and UL transmission is less than or equal to 16 µs. Another option in case the gap is larger than 16 µs is for the UE to perform a short 25 µs CCA. Operation in this manner is typically called "COT sharing."

Figure 2:
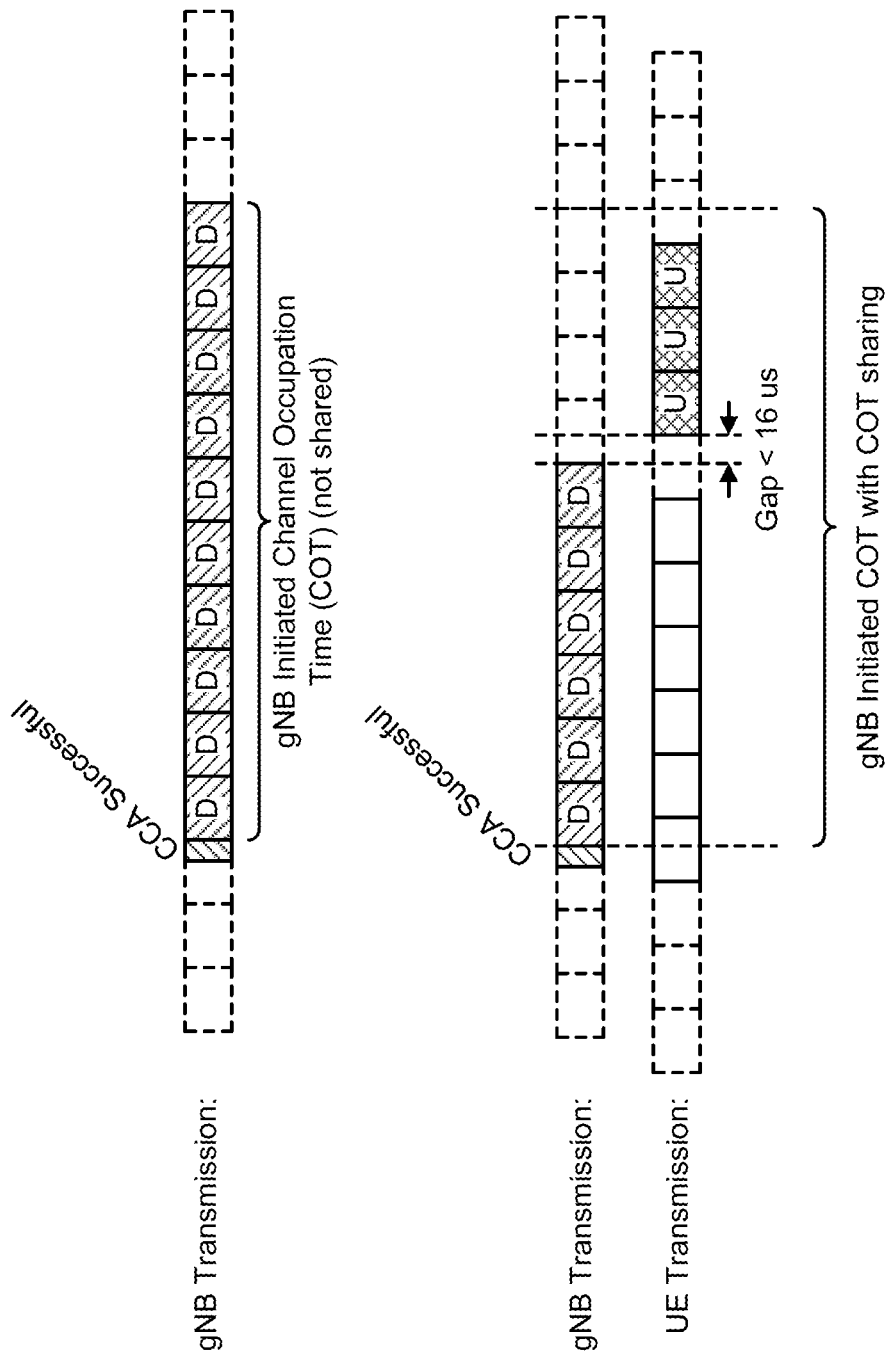
FIG. 2 illustrates a transmit opportunity (TXOP) both with and without channel occupancy time (COT) sharing after clear channel assessment (CCA) is successful at the next generation nodeB (gNB).

FIG. 2 illustrates a TXOP both with and without COT sharing after CCA is successful at the gNB.

The lack of full control of the radio channel impacts virtually every aspect of the network's operations involving radio interface transmissions.

Another characteristic property of NR-U is that, in contrast to the case of NR operating in licensed spectrum, an NR-U system of a certain PLMN may share the spectrum with NR-U systems belonging to other PLMNs in the same area. Hence, in contrast to the case of NR operating in licensed spectrum, a UE cannot be sure that another NR-U cell operating on the same frequency band and in the same area as the UE's serving NR-U cell belongs to the same PLMN as the serving NR-U cell.

Multi-Channel UL Transmission for LTE-eLAA

The baseline for LTE-LAA UL multicarrier operation is the extension of the single carrier operation when the eNB schedules PUSCH transmissions on multiple carriers. The LBT type on each carrier is signaled to the UE via corresponding UL grant.

Moreover, a UE that has received UL grants on a set of carriers scheduled with Category 4 (Cat. 4) LBT with the same starting point in the subframe on all carriers can switch to a 25 µs LBT immediately before transmission on a carrier in the set if Cat. 4 LBT has successfully completed on a designated carrier in the set. The UE must select one carrier uniformly randomly among the carriers which were scheduled with Cat. 4 LBT as the designated carrier prior to starting the Cat. 4 LBT procedure on any of the carriers in the set.

Figure 3:
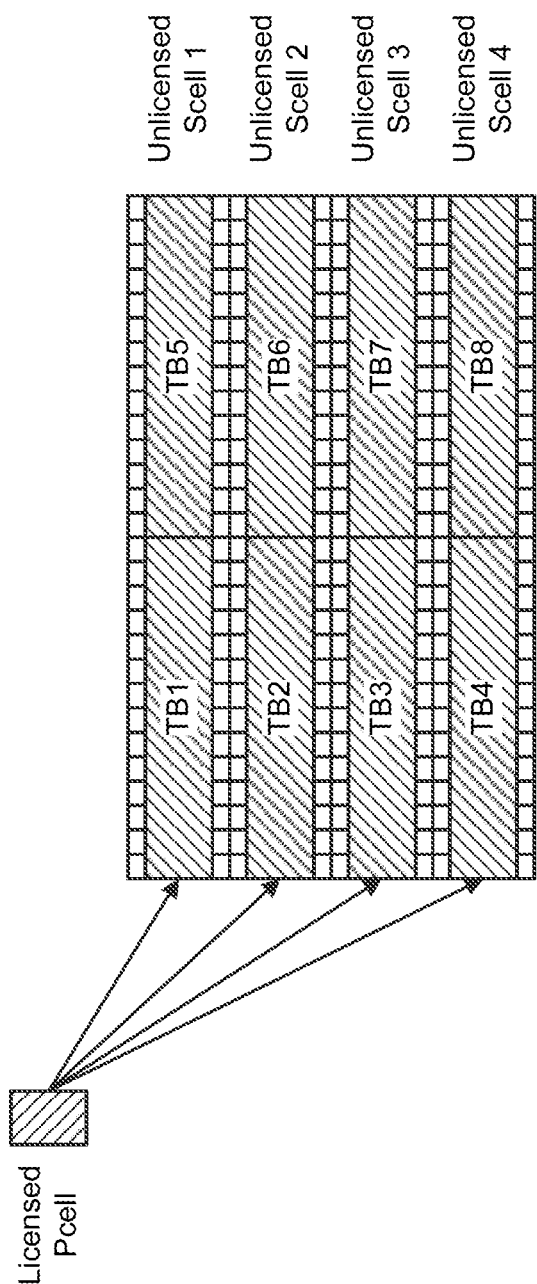
FIG. 3 illustrates different transport blocks (TBs) generated for carriers and subframes.

Note that different transport blocks (TBs) are generated for each carrier and subframe as shown in FIG. 3 when LBT is successful in multiple channels according to the above-mentioned rules. It is clear that guard band is available for each carrier. This is because of LTE limitation, i.e., the maximum bandwidth LTE could support is 20 MHz.

Multi-Channel UL Transmission for Wi-Fi

Figure 4:
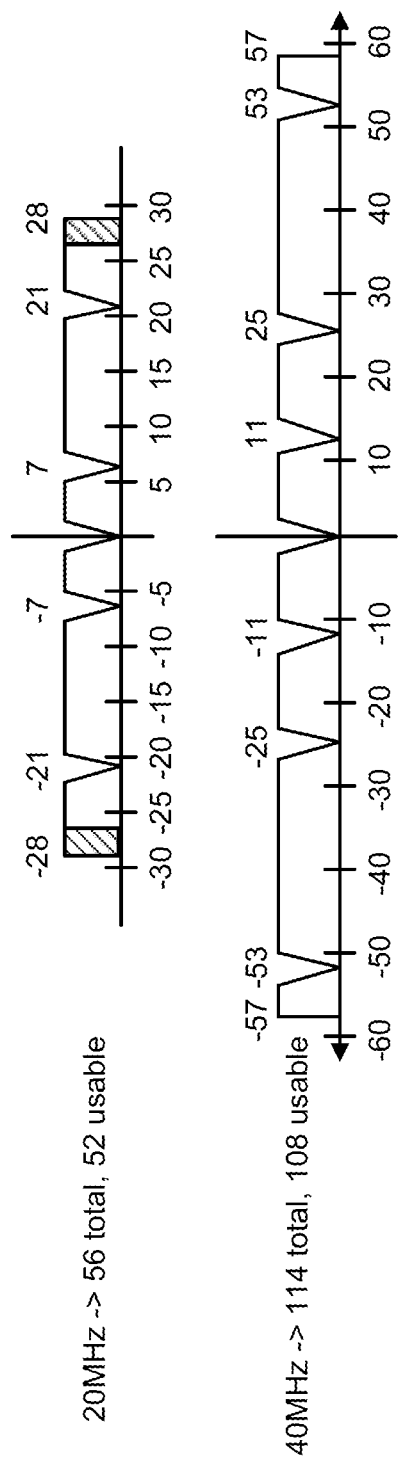
FIG. 4 illustrates usable subcarriers with 20 MHz and 40 MHz.

Unlike eLAA, Wi-Fi (i.e., 802.11n, 802.11ac, etc.) defines new wider channel other than 20 MHz. As shown in FIG. 4, 40 MHz could bring more usable subcarriers than simple aggregation of two 20 MHz. The benefit comes from two aspects: one is guard band decrease and the other is pilot subcarrier overhead savings. So wider channel could bring higher spectrum efficiency.

Before transmitting a 40 MHz frame, a device is responsible for ensuring that the entire 40 MHz channel is clear. Clear-channel assessment is performed on the primary channel according to the well-understood rules for transmission on an 802.11 channel. Even if the device intends to transmit a 40 MHz frame, the slot boundaries and timing are based on access to the primary channel only. The secondary channel must be idle during the priority interframe space before it may be used as part of a 40 MHz transmission. In Wi-Fi, UE decides when and how to transmit UL data itself based on LBT results, i.e., 20 MHz and 40 MHz transmission.

NR Wideband Operation and LBT Sub-Bands

Similar to NR, NR-U will support transmissions with wide bandwidth, e.g., up to several hundreds of MHz bandwidth. However, there could be different radio technologies with different device's capabilities that simultaneously share the same spectrum. It is unlikely that a device will sense the channel free over the whole wide bandwidth, especially at high load. Thus, it is beneficial for NR-U to support transmissions with dynamic bandwidth, in which the device can decide which part(s) of the supported bandwidth to use based on its LBT outcome.

Figure 5B:
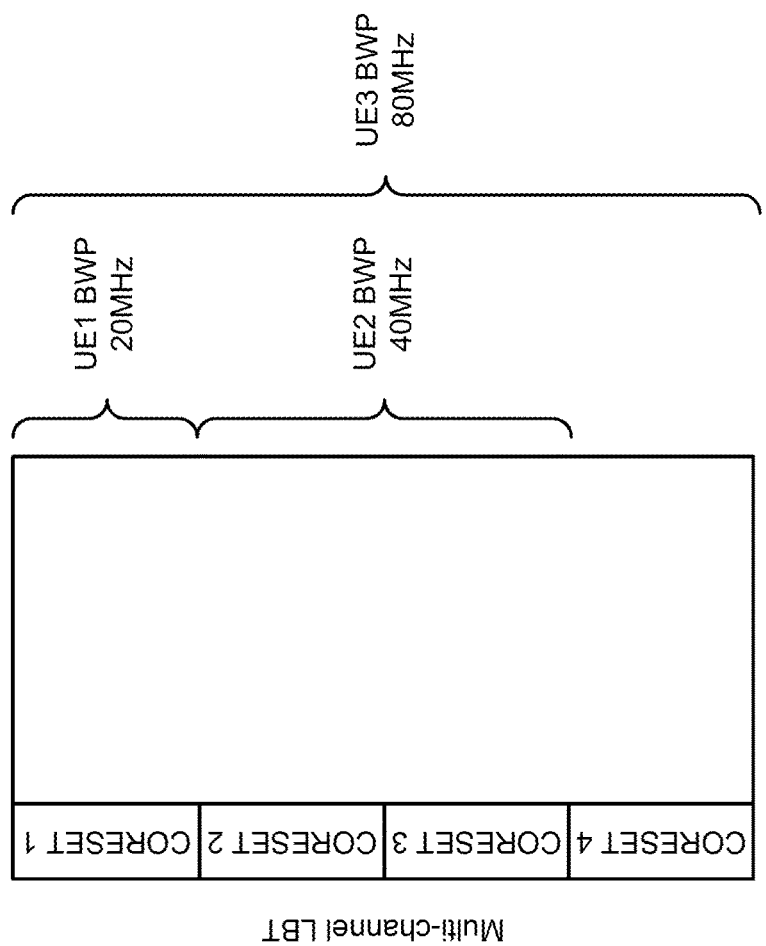
FIGS. 5A-5B illustrate wideband operations using carrier aggregation (CA) and single system carrier with the bandwidth of 80 MHz.
Figure 5A:
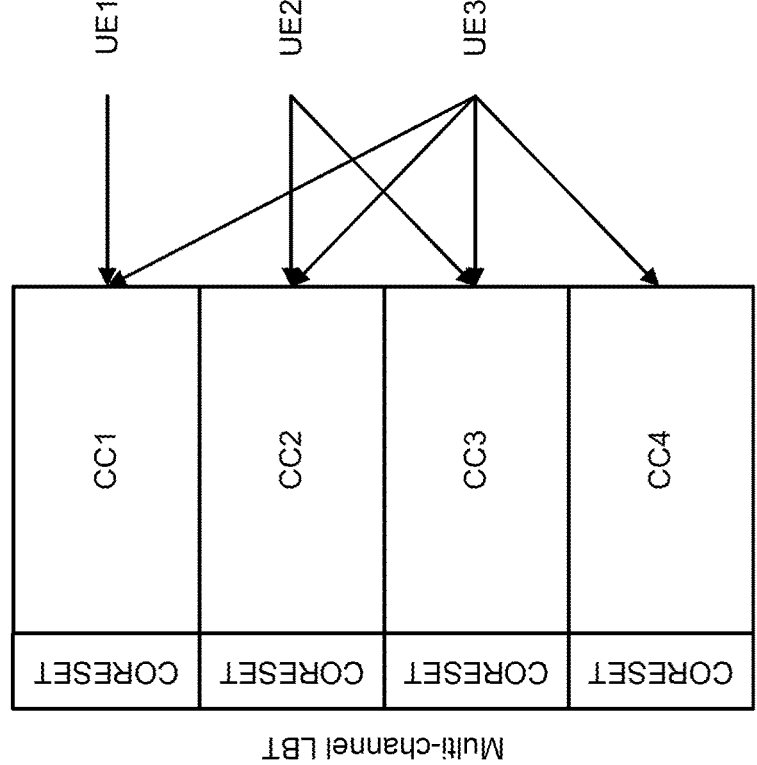

There are two common approaches for the device to use in wideband transmissions: carrier aggregation (CA) and single carrier wideband transmissions. In CA transmissions (similar to LTE-based LAA), the device performs LBT per component carrier (of, e.g., 20 MHz), then transmits on each component carrier (CC) in which LBT is successful. In single carrier wideband transmissions, the device performs LBT per LBT sub-band (of 20 MHz) (also called an LBT bandwidth) and aggregates resources from each free LBT sub-band in a single physical SCH. FIGS. 5A-B show an example for the wideband operations using CA (FIG. 5A) and single system carrier bandwidth of 80 MHz (FIG. 5B). Different UEs may operate on different maximum bandwidth sizes and transmit with a different number of RBs depending on their LBTs outcomes.

FIGS. 5A-B consider only 80 MHz bandwidth; however, wideband operation can span more than 80 MHz through configuration of additional component carriers, either 20 MHz or wider, and the same principles as described above apply. Note that a control resource set (CORESET) is a set of physical resources (i.e., a specific area on NR Downlink Resource Grid) and a set of parameters that is used to carry PDCCH/DCI). In NR, a CORESET region is localized to a specific region in frequency domain.

In principle, if a large number of control resource sets (CORESETs) can be configured, then separate CORESETs and search spaces need to be configured for different LBT sub-bands to ensure the availability of control signaling when at least one LBT sub-band is available. In the example shown in FIG. 5B, UE2 needs to monitor both CORESET2 and CORESET3 since the channel may be available only in LBT sub-band 2 or only in LBT sub-band 3. Similarly, UE3 shall monitor all four CORESETs to get its PDCCH. Furthermore, it is undesirable to configure a wide CORESET across LBT sub-bands. Either the PDCCH is interleaved across the LBT sub-bands or all PDCCH candidates are located in the available LBT sub-bands when part of the channel is busy. Both result in loss of scheduling opportunities. Hence, there is no fundamental difference between the CA and wide BWP approaches in terms of number of CORESETs and search spaces to monitor by the UE. There is one difference, however, and that is with respect to UE capability. In 3GPP NR Release 15 (Rel-15), only up to 3 CORESETs can be configured, which puts a limit on the number of locations in the frequency domain that the UE can monitor for PDCCH.

Measurements Performed by UEs in NR

A UE in a 5G/NR network will perform various measurements on downlink transmissions in RRC_IDLE, RRC_INACTIVE and RRC_CONNECTED state.

RRC_IDLE/RRC_INACTIVE State Measurement Framework

A UE in RRC_IDLE or RRC_INACTIVE state repeatedly performs measurements on DL reference signals (the synchronization signal block (SSB) in the case of RRC_IDLE/RRC_INACTIVE state) in its current cell as well as in neighbor cells to assess the cell's suitability for camping (where the camping cell is the cell in which the UE monitors relevant DL control signaling, such as paging and system information).

If a neighbor cell, based on the measurement, fulfills the criteria for cell re-selection, the UE will re-select to that cell (i.e., make this cell its new camping cell), provided that there is nothing in the cell's system information that implies that the UE is not allowed to camp on that cell for regular service (such as that the cell belongs to a tracking area that is forbidden for the concerned UE).

To support and guide the UE in the cell re-selection process and the associated measurements, the gNB provides related information in system information block 2 (SIB2) to SIB5. SIB2 provides various thresholds and offsets applicable for intra-frequency, inter-frequency and inter-RAT cell re-selection. SIB3 provides information relevant for intra-frequency cell re-selection, such as neighbor cell information (including an optional blocklist of cells not allowed to re-select to (IntraFreqBlackCellList)). SIB4 provides information relevant for inter-frequency cell re-selection, such as carrier frequency information and neighbor cell information (including an optional blocklist of cells not allowed to re-select to (InterFreqBlackCellList)). SIB5 contains information relevant for inter-RAT cell re-selection (to E-UTRA cells), such as carrier frequency information and neighbor cell information (including an optional blocklist of cells not allowed to re-select to (EUTRA-FreqBlackCellList)). For both intra-frequency and inter-frequency cell re-selection, the network can also configure cells specific offsets for selected neighbor cells, which are collected in the intraFreqNeighCellList in SIB3 and in the InterFreqNeighCellList in SIB4. Currently, there is no possibility for an NR network to configure the opposite of a blocklist, i.e., an allow-list (whitelist), which contains the cells a UE shall consider for cell re-selection, e.g., measure and evaluate for cell re-selection assessment purpose, provided the cell is detectable, but such a list will be introduced for NR operating in unlicensed spectrum (NR-U).

RRC_CONNECTED State Measurement Framework

Measurements on the DL radio channel quality (e.g., in terms of RSRP, RSRQ, RSSI, SINR, SNR or pathloss) performed by the UE is an important tool to maintain the communication between the network/gNB and the UE in RRC_CONNECTED state, e.g., to enable the gNB to make well-founded decisions regarding handover, i.e., when a UE's connection with the network is switched from one cell to another. To this end, the 3GPP NR (and LTE) standard specifications contain a comprehensive framework covering configuration and execution of a UE's measurements as well as the reporting of the measurement results.

The network (e.g., through a gNB) can configure a UE in RRC_CONNECTED state to perform measurements on the serving cell(s) and on neighbor cells and report the results to the network (gNB) when appropriate. As mentioned, the specified measurement framework is quite comprehensive, and it will not be described in detail here. At the highest level, measurement configuration consists of measurement objects ("measObjectNR" in ASN.1 code in 3GPP TS 38.331), reporting configurations ("reportConfigNR" in ASN.1 code in 3GPP TS 38.331), and measurement identities ("measId" in ASN.1 code in 3GPP TS 38.331), where a measurement identity links a measurement object and a reporting configuration together. This measurement configuration information is conveyed to the UE in RRCReconfiguration messages (i.e., dedicated RRC signaling) using the umbrella information element (IE) "MeasConfig" (which may contain multiple measurement identities, measurement objects and reporting configurations) and the UE accumulates the measurement configuration information in the VarMeasConfig variable (i.e., the accumulated results of additions, modifications and removals of measurement objects, measurement configurations and measurement identities). Measurement reports containing measurement results are transmitted from the UE to the gNB using RRC MeasurementReport messages.

A UE that is configured to measure on the serving cell(s) and neighbor cells receives and measures on the concerned cells' reference signals of the type (SSB or channel state information reference signal (CSI-RS)) indicated in the configuration. The UE is also configured to report its measurement results to the serving gNB according to configured criteria. The reporting criteria is indicated in the reportType parameter in the ReportConfigNR IE and can be set to "eventTriggered", "periodical", "reportCGI", or "reportSFTD". When the reportType parameter is set to "eventTriggered" measurement reporting is triggered when a certain event definition (typically consisting of one or more radio channel quality thresholds) is fulfilled and the UE then continues to send periodical measurement reports with intervals ranging from 120 milliseconds to 30 minutes, as configured by the reportInterval parameter in the Report-Config IE, as long as the trigger condition is fulfilled.

If the reportType is set to "periodical", the UE transmits periodic measurement reports as configured by the report-Interval parameter, without considering any trigger condition.

If the reportType is set to "reportCGI", the UE reads and reports (to the serving gNB) relevant system information in the cell indicated by the cellForWhichToReportCGI parameter for the concerned measurement object.

If the reportType is set to "reportSFTD", the UE measures and reports the SFN (system frame number, a number assigned to each radio frame, and the value ranges from 0 to 1,023 in one embodiment) and System Frame Timing Difference (SFTD) between a pair of PCell and PSCell together with RSRP.

Cell Global Identifier (CGI) Report Content

In the context of the present disclosure, the reportType "reportCGI" is particularly relevant. This type of report configuration, i.e., where the reportType is set to "reportCGI" is typically used for the Automatic Neighbor Relation (ANR) feature, where the network uses UEs to discover new neighbor cells and base stations to establish neighbor relationship to. The cellForWhichToReportCGI parameter then contains a Physical Cell Identity (PCI) (which in NR is derived from the cell's synchronization signal block (SSB)) of a cell that the UE has previously detected and reported to the network. Note that reading system information represents an additional effort compared to just receiving and measuring on a reference signal.

The following excerpts from TS 38.331 v15.6.0 describe what the UE reports when the reportType is set to "reportCGI".

Excerpt from chapter 5.5.4 in TS 38.331 v15.6.0:
2> if reportType is set to reportCGI:
  3> if the UE acquired the SIB1 or SystemInformation-BlockType1 for the requested cell; or
  3> if the UE detects that the requested NR cell is not transmitting SIB1 (see TS 38.213 [13], clause 13):
    4> stop timer T321;
    4> include a measurement reporting entry within the VarMeasReportList for this measId;
    4> set the numberOfReportsSent defined within the VarMeasReportList for this measId to 0;
    4> initiate the measurement reporting procedure, as specified in 5.5.5;"

Excerpt from chapter 5.5.5 in TS 38.331 v15.6.0:
2> if the reportType is set to eventTriggered or periodical:
. . .
2> else: [that is, if reportType is set to reportCGI (remark by the present disclosure).]
  3> if the cell indicated by cellForWhichToReport-CGIis an NR cell:
    4> if plmn-IdentityInfoList of the cgi-Info for the concerned cell has been obtained:
      5> include the plmn-IdentityInfoList including plmn-IdentityList, trackingAreaCode (if available), ranac (if available) and cellIdentity for each entry of the plmn-IdentityInfoList;
      5> include frequencyBandList if available;
    4> else if MIB indicates the SIB1 is not broadcast:
      5> include the no SIB1 including the ssb-SubcarrierOffset and pdcch-ConfigSIB1 obtained from MIB of the concerned cell;
  3> if the cell indicated by cellForWhichToReport-CGIis an E-UTRA cell:
    4> if all mandatory fields of the cgi-Info-EPC for the concerned cell have been obtained:
      5> include in the cgi-Info-EPC the fields broadcasted in E-UTRA SystemInformationBlock-Type1 associated to EPC;
    4> if the UE is E-UTRA/5GC capable and all mandatory fields of the cgi-Info-5GC for the concerned cell have been obtained:
      5> include in the cgi-Info-5GC the fields broadcasted in E-UTRA SystemInformationBlock-Type1 associated to 5GC;
    4> if the mandatory present fields of the cgi-Info for the cell indicated by the cellForWhichTo-ReportCGI in the associated measObject have been obtained:
      5> include thefreqBandIndicator;
      5> if the cell broadcasts the multiBandInfoList, include the multiBandInfoList;
      5> if the cell broadcasts thefreqBandIndicator-Priority, include the freqBandIndicatorPriority;"

UE Procedure for Reporting CGI

As discussed above, a UE configured to measure on a neighbor cell receives and measures on the neighbor cell's synchronization signal/physical broadcast channel (SS/PBCH) block indicated in the measurement configuration. Synchronization signal and PBCH channel are packed as a single block that moves together. The components of this block include: Synchronization Signal: PSS (Primary Synchronization Signal), SSS (Secondary Synchronization Signal) and PBCH: PBCH DMRS and PBCH data. The SS/PBCH block is a type of synchronization signal block.

For the purposes of reporting a cell global identifier (CGI) to support automatic neighbor relations (ANR) functionality, the UE is configured to report its measurement results to the serving gNB according to a configured criterion. The reporting criterion is indicated in the reportType parameter in the ReportConfigNR IE, and to support ANR, it is set to "reportCGI."

In order to report CGI, the UE must perform the following procedures:

The UE obtains the absolute frequency position ($f_{SSB}$) of the SS/PBCH block on which it should measure via RRC configuration of the measurement object IE MeasObjectNR.

The UE detects the SSB and decodes the PBCH which contains the master information block (MIB).

The MIB informs the UE on the frequency position of CORESET0 via the two offset parameters $k_{SSB}$ and K. See FIG. 6 which shows an example of the location of the SS/PBCH block and CORESET0 for the example of 30 kHz subcarrier spacing (SCS). In this example, CORESET0 has a size of 48 PRBs. The SS/PBCH block is always 20 PRBs for 30 kHz SCS.

$k_{SSB}$ is the offset (in terms of an integer number of 15 kHz subcarriers) between the lowest indexed subcarrier of the SS/PBCH block and a 12-RB boundary on the 15 kHz reference RB grid. For 30 kHz SSB/CORESET0, $k_{SSB}$ is always even-valued integer.

K is the PRB offset between the 12-RB boundary of the reference RB grid and the lowest indexed subcarrier of CORESET0. The total offset from the bottom of the SS/PBCH block to the bottom of CORESET0 for the case of 30 kHz SCS is thus $12 \times K + k_{SSB}/2$ number of 30 kHz subcarriers. Note that when the SCS is in a different frequency (e.g., 15 kHz), the offset calculation is different (e.g., $12 \times K + k_{SSB}$ with 15 kHz SCS).

Once UE determines the frequency position of CORESET0, it decodes PDCCH in the Type0-PDCCH search space associated with CORESET0.

Based on the scheduling information in the PDCCH, the UE decodes the PDSCH carrying SIB1.

The UE reads and reports the CGI contained in SIB1.

Figure 6:
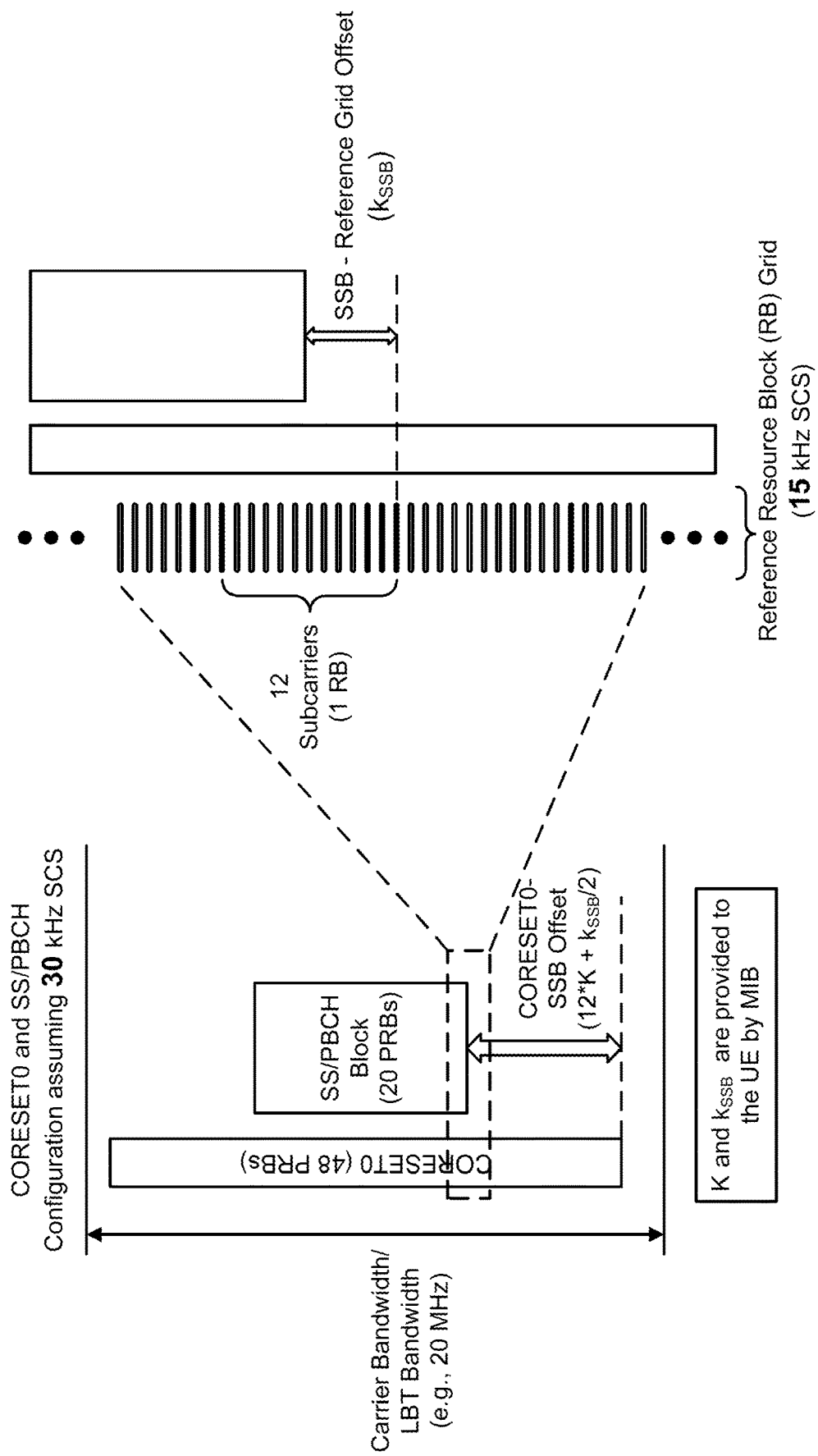
FIG. 6 illustrates the relative locations of synchronization signal/physical broadcast channel (SS/PBCH) block and a control resource set 0 (CORESET0) based on $k_{SSB}$ and K.
Figure 7:
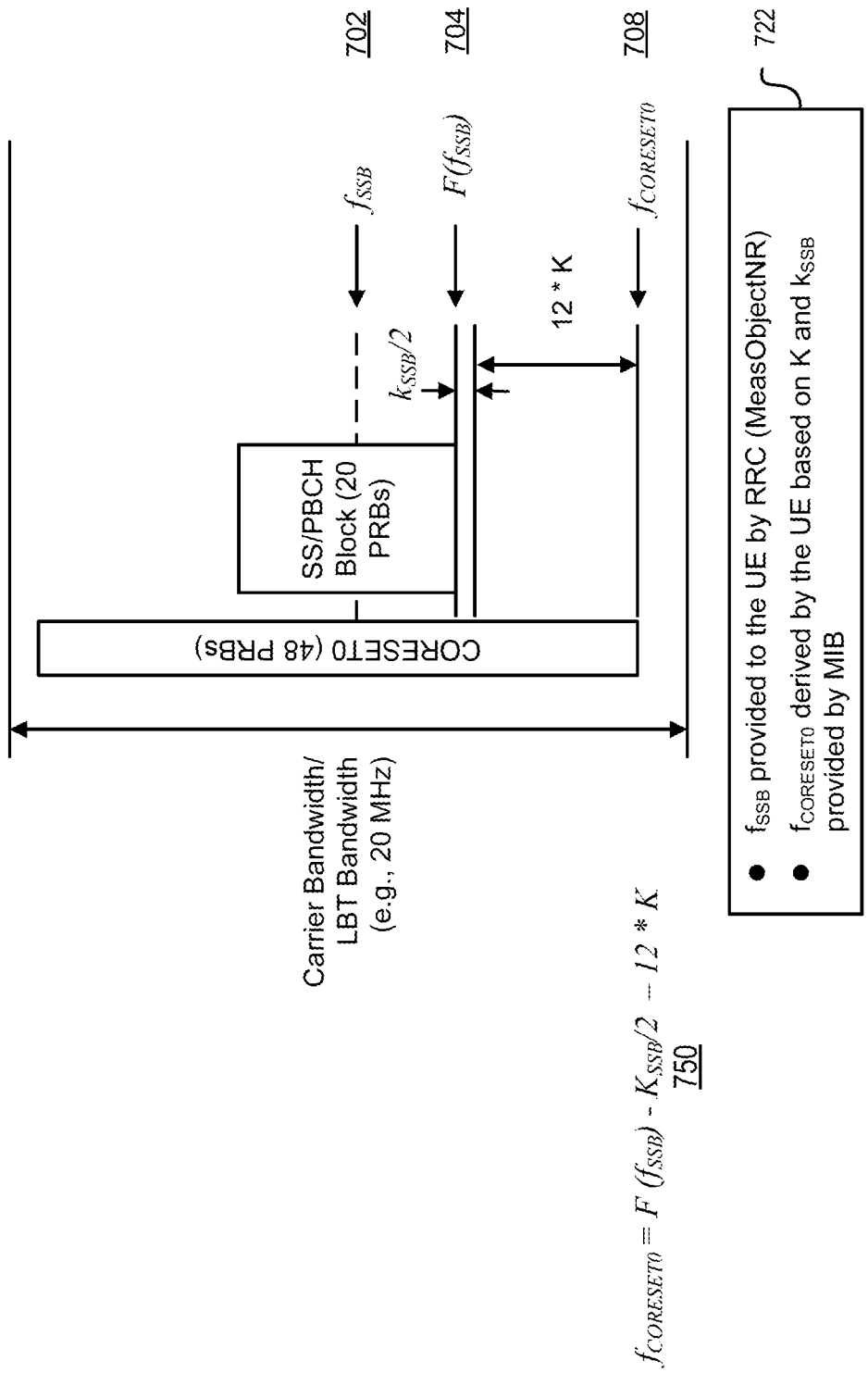
FIG. 7 illustrates deriving $f_{CORESET0}$ based on $k_{SSB}$ and K.

There currently exist certain challenge(s). FIGS. 6 and 7 illustrate a problem with existing solution. As shown in FIG. 6, the CORESET0 bandwidth (48 PRBs) occupies most of the carrier bandwidth (for a 20 MHz carrier) or the LBT bandwidth (20 MHz portion of a wider carrier, e.g., 80 MHz). Furthermore, the offset values $k_{SSB}$ and K have a quite restricted range. $k_{SSB}$ can range from 0 up to 23 (maximum of one 30 kHz PRB only). For the case of 30 kHz SSB/CORESET0, K can take only the values 12, 14, and 16 PRBs.

As shown in FIG. 7, the relative frequency positions between the SS/PBCH block and CORESET0 may be calculated based on $k_{SSB}$ and K. From the absolute frequency position ($f_{SSB}$) of the SS/PBCH block at reference 702, one may obtain the frequency position F ($f_{SSB}$) at the bottom of the SS/PBCH block at reference 704. The function F0 is to subtract half of the SS/PBCH block bandwidth since $f_{SSB}$ is at the center of the SS/PBCH block. The starting frequency of the CORESET0, $f_{CORESET0}$, shown at reference 708, may be obtained through the formula as shown at reference 750, i.e., $f_{CORESET0} = F(f_{SSB}) - k_{SSB}/2 - 12 \times K$. As noted earlier, the formula is for SCS at 30 kHz and it changes with a different SCS (e.g., $k_{SSB}/2$ will be replaced by $k_{SSB}$ with 15 kHz SCS). Yet in a given configuration, once $f_{SSB}$, $k_{SSB}$, and K are known, the CORESET0 frequency position, identified by $f_{CORESET0}$, is determined.

In scenarios where the CORESET0 bandwidth occupies most of the carrier bandwidth/LBT bandwidth (as agreed in 3GPP for the case of NR-U), the gNB has quite restricted flexibility on where within the carrier/LBT sub-band it can transmit an SS/PBCH block. In the above example, the SS/PBCH block is restricted to be close to the middle of the carrier/LBT sub-band. Making the problem even worse is that in unlicensed operation, the number of signaled K values may be reduced to a very small number (maybe just one or two), thus further restricting the flexibility of SS/PBCH transmission.

For example, such inflexibility is undesirable for unlicensed operation where it is beneficial in a non-standalone (NSA) deployment to flexibly position the SS/PBCH blocks within the unlicensed carriers when SIB1 is transmitted on the unlicensed carriers to support automatic neighbor relations (ANR) functionality. Without such flexibility, collisions will occur with the SS/PBCH blocks transmitted on the same unlicensed carriers of another operator's network deployed in the same geographic area. This can degrade synchronization performance and cause battery drain issues if UEs in the other operator's network attempt initial access on the unlicensed cells of the NSA operator only to find that those cells are barred for access.

To solve problems like these, embodiments of the present disclosure allow different operators to set the positions the SS/PBCH blocks differently, where one operator may set the SS/PBCH to be close to the beginning of the carrier/LBT sub-band and another operator may set the SS/PBCH to be close to the end of the carrier/LBT sub-band, and collisions will be reduced and the operators may communicate using their initial access signals and channels (e.g., SS/PBCH) more efficiently, and they will be able to report the cell global identifier (CGI) more efficiently (e.g., less collision and easier synchronization with a neighbor cell so that the CORESET can be located and CGI can be identified).

The present disclosure allows increased flexibility for the frequency domain position of an SS/PBCH block transmission for the case when the CORESET0 bandwidth occupies a large fraction of the carrier bandwidth/LBT bandwidth and when the frequency position of the SS/PBCH block is signaled to the UE. This scenario occurs, for example, when the UE is configured to report CGI on a certain frequency for a previously reported PCI in order to support automatic neighbor relations functionality.

The present disclosure is based on the UE being provided with an intermediate reference frequency or reference frequency offset that effectively decouples the frequency position of the SS/PBCH block from the signaled values of K and $k_{SSB}$ in MIB. The reference frequency/reference frequency offset is either provided to the UE explicitly through network signaling or implicitly via specification and rules therein.

Certain aspects of the present disclosure and their embodiments may provide solutions to these or other challenges.

Certain embodiments may provide one or more of the following technical advantage(s). Increased flexibility in the frequency domain position of the SS/PBCH block transmission is beneficial to avoid SS/PBCH block collisions between operators. Avoiding collisions can improve synchronization performance and reduce battery drain. Avoiding collisions can prevent UEs in another operator's network from performing initial access on the cells only to find the cells are barred.

Some of the embodiments contemplated herein will now be described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

In one embodiment, a UE configured to measure on a neighbor cell receives and measures on the neighbor cell's SS/PBCH block indicated in the measurement configuration. For the purposes of reporting a cell global identifier (CGI) to support automatic neighbor relations (ANR) functionality, the UE is configured to report its measurement results to the serving gNB according to a configured criterion. The reporting criterion is indicated in the reportType parameter in the ReportConfigNR IE, and to support ANR, it is set to "reportCGI."

In this process, the UE is informed via the measurement object (MeasObjectNR) of the absolute frequency position ($f_{SSB}$) of the SS/PBCH block on which it should measure in order to detect/decode the contents of the master information block (MIB). The MIB informs the UE of the configuration of the Type0-PDCCH common search space associated with CORESET0. The PDCCH transmitted in this search space provides scheduling information about the PDSCH that carries SIB1. SIB1 in turn contains the CGI. Hence, upon measuring the SS/PBCH block, decoding the MIB, decoding the PDCCH, and decoding PDSCH carrying SIB1, the UE is able to report the CGI as configured.

Figure 8:
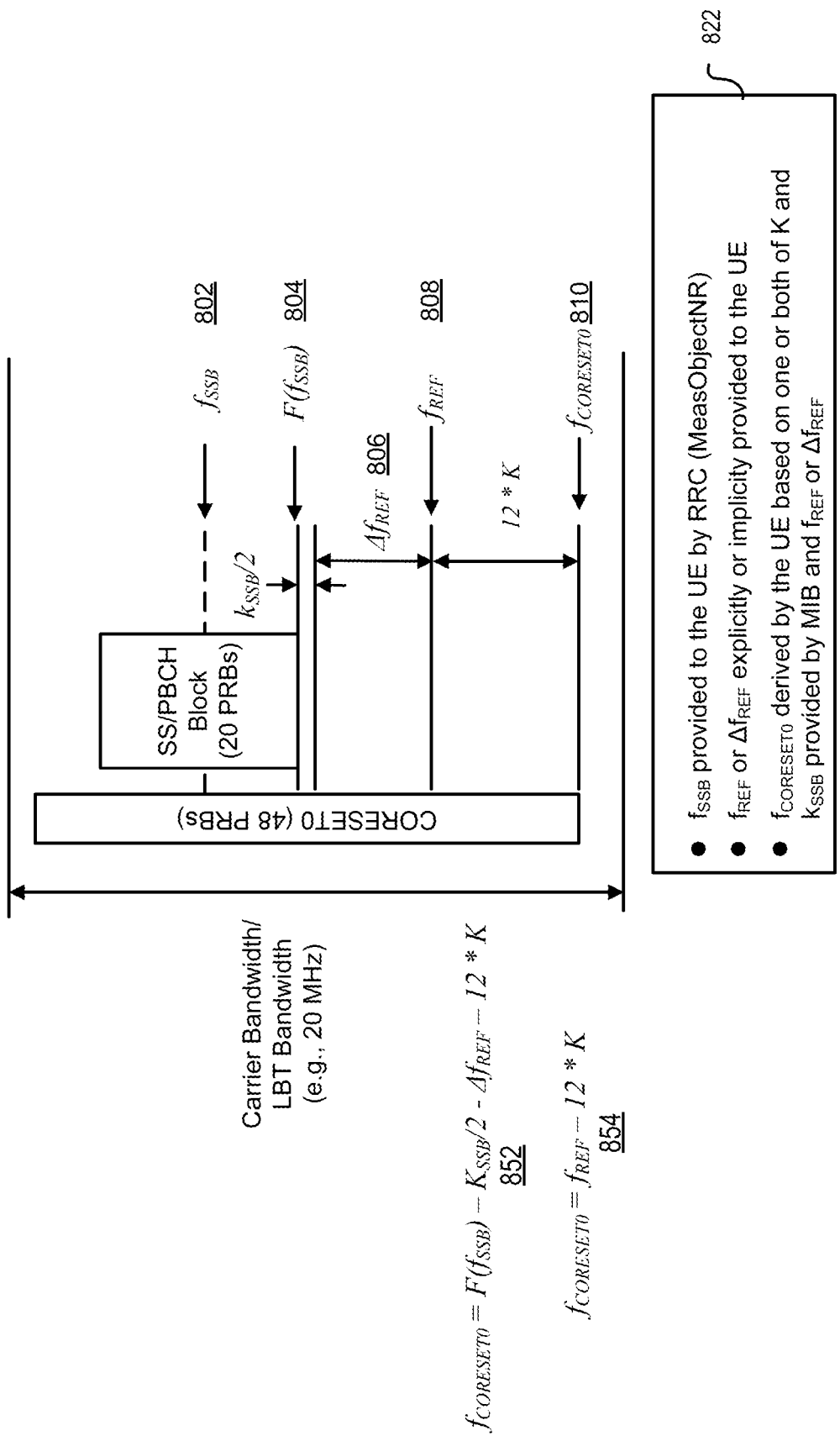
FIG. 8 illustrates deriving $f_{CORESET0}$ based on at least a first set of $f_{REF}$ and/or $\Delta f_{REF}$ in accordance with embodiments of the invention (Procedure A).
Figure 9:
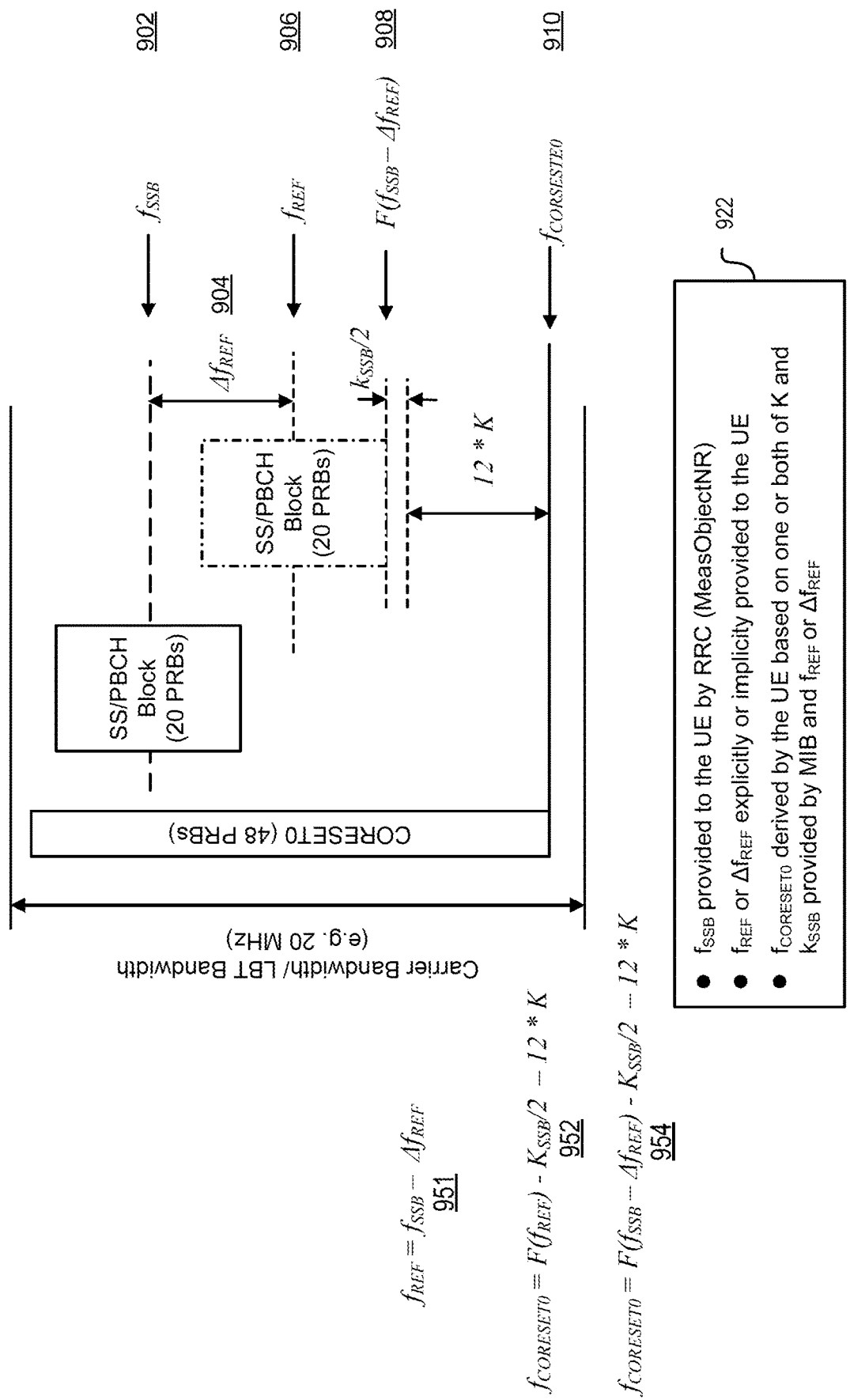
FIG. 9 illustrates deriving $f_{CORESET0}$ based on at least a second set of $f_{REF}$ and/or $\Delta f_{REF}$ in accordance with embodiments of the invention (Procedure B).
Figure 10:
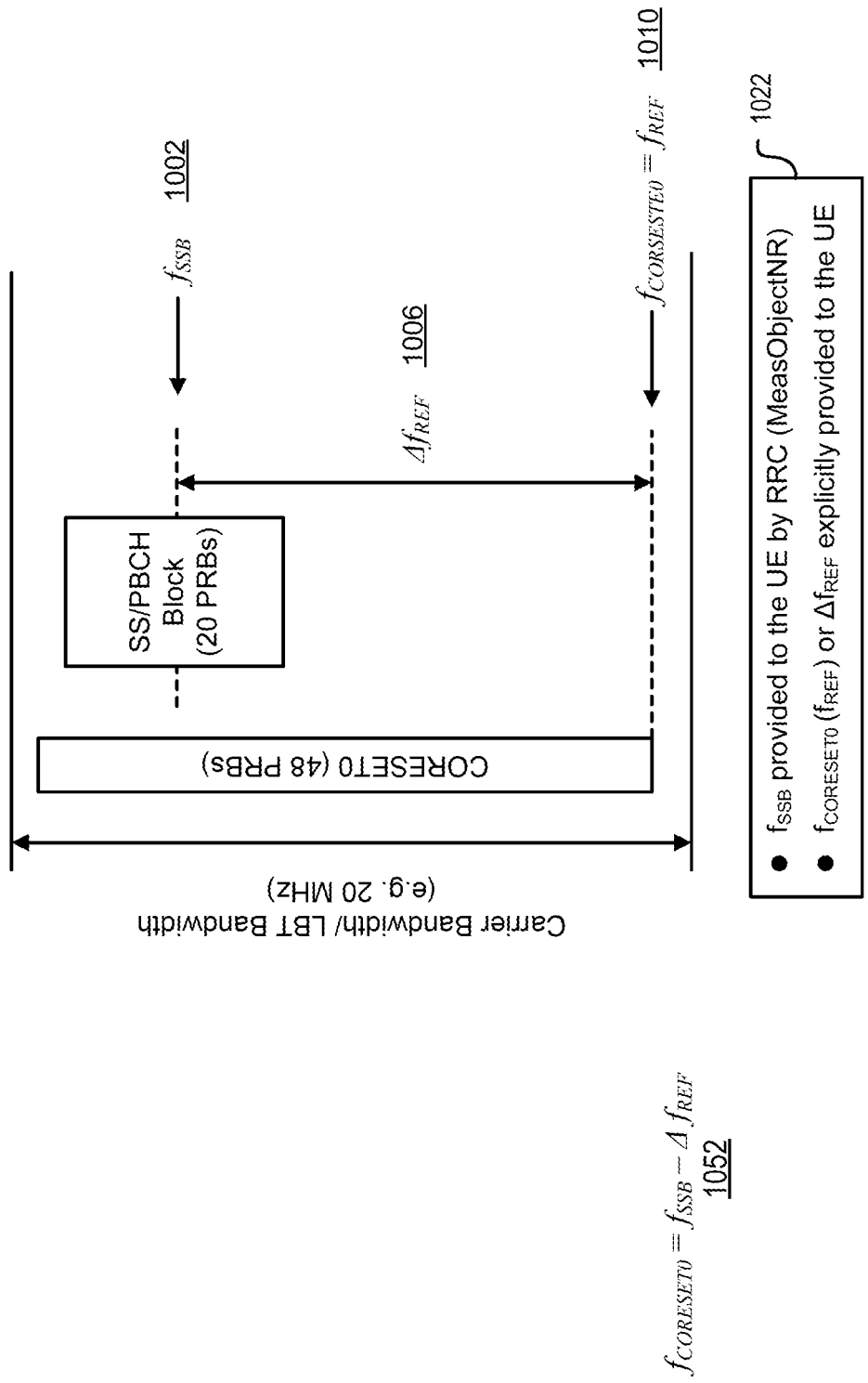
FIG. 10 illustrates deriving $f_{CORESET0}$ based on at least a third set of $f_{REF}$ and/or $\Delta f_{REF}$ in accordance with embodiments of the invention (Procedure C).

The present disclosure enables a higher degree of flexibility in the frequency domain position of the SS/PBCH block transmitted by the neighbor gNB by partially decoupling the SS/PBCH block position from the offset parameters K and $k_{SSB}$ signaled in the MIB. This is achieved by providing the UE with an intermediate reference frequency ($f_{REF}$) or a reference frequency offset ($\Delta f_{REF}$) that the UE can use to determine the frequency position of CORESET0, in addition to using one or both of the MIB parameters K and $k_{SSB}$. This is illustrated in FIG. 8, FIG. 9, and FIG. 10.

Below describes embodiments and variations (Embodiment Sets #1,2) in which the UE is provided with the reference frequency (or frequency offset) explicitly via network signaling or the UE determines the reference frequency (or frequency offset) implicitly in according to embodiments of the invention. Additionally, several variations of a UE procedure for determining the frequency position of CORESET0 ($f_{CORESET0}$) are disclosed and they are referred to as Procedures A, B, and C and they apply to all embodiments/variations of the present disclosure, both explicit and implicit ones.

Procedure A:

In this procedure, the UE determines the frequency position of CORESET0 ($f_{CORESET0}$) based on using $f_{REF}$ or $\Delta f_{REF}$ as follows (refer to FIG. 8):

Using $f_{REF}$:
  The UE determines the frequency position of CORESET0 ($f_{CORESET0}$) based only on $f_{REF}$ and the offset parameter K provided by MIB (knowledge of $k_{SSB}$ is not needed).
  In one non-limiting example, $f_{CORESET0}$ is determined as the difference between $f_{REF}$ and a scaled version of the offset parameter K as shown at reference 854.

Using $\Delta f_{REF}$:
  The UE determines the frequency position of CORESET0 ($f_{CORESET0}$) based on the provided frequency position of the SS/PBCH block $f_{SSB}$, both parameters K and $k_{SSB}$ provided by MIB, as well as the provided frequency offset $\Delta f_{REF}$.
  In one non-limiting example, the $f_{CORESET0}$ is determined simply as the difference between $f_{SSB}$ (or known shift of $f_{SSB}$) and the sum of scaled versions of the offsets K and $k_{SSB}$ and $\Delta f_{REF}$ as shown at reference 852.

As can be seen from FIG. 8, providing the UE with $f_{REF}$ or $\Delta f_{REF}$ allows the SS/PBCH block to be moved up or down freely without being tied rigidly to the signaled values of K and $k_{SSB}$ (only a small number of K values are available).

Procedure B:

A variation of Procedure A is illustrated in FIG. 9. In this procedure, $k_{SSB}$ and K are applied in the same way as in FIG. 7 but they are relative to $f_{REF}$ at reference 906 or $f_{SSB}$-$\Delta f_{REF}$ instead of relative to $f_{SSB}$ as in Procedure A. In FIG. 9, $f_{REF}$ is the frequency position of a hypothetically transmitted SS/PBCH block, whose bottom frequency is at reference 908, and $f_{CORESET0}$ may be calculated from the given $f_{REF}$ and $\Delta f_{REF}$ relating to the hypothetically transmitted SS/PBCH block as shown at reference 952 and 954 respectively.

Procedure C:

Another variation of Procedure A is illustrated in FIG. 10. In this procedure, $f_{CORESET0}$ ($f_{REF}$) is explicitly signaled to the UE. An alternative is that $\Delta f_{REF}$ is signaled to the UE and the UE determines $f_{CORESET0}$ using both $\Delta f_{REF}$ and $f_{SSB}$.

Embodiment Set #1 (Explicit Indication of Reference Frequency or Frequency Offset)

A method implemented in a UE for obtaining a cell global identifier (CGI) where the UE obtains the reference frequency $f_{REF}$ or reference frequency offset $\Delta f_{REF}$ in an RRC information element (IE) associated with the CGI measurement
  In one variation of this embodiment, $f_{REF}$ or $\Delta f_{REF}$ is provided in a report configuration IE (ReportConfigNR)
  In another variation, $f_{REF}$ or $\Delta f_{REF}$ is provided in a measurement object IE (MeasObjectNR)
  Variations for configuring the absolute frequency $f_{REF}$ are:
    In terms of an NR Absolute Radio Frequency Channel Number (NR-ARFCN) as specified in 3GPP TS 38.104;
    In terms of a Global Synchronization Channel Number (GSCN) as specified in 3GPP TS 38.104; and
    In terms of Hz (MHz, kHz).
  Variations for configuring the frequency offset $\Delta f_{REF}$ are:
    Number of subcarriers assuming a reference subcarrier spacing, e.g., 15 kHz; and
    Number of resource blocks (RBs) or physical resource blocks (PRBs).
  Based on the obtained $f_{REF}$ or $\Delta f_{REF}$, the UE determines the frequency position of CORESET0 ($f_{CORESET0}$) using any of the procedures described above.
  The UE attempts to decode a PDCCH in the Type0-PDCCH common search space associated with CORESET0 in order to decode PDSCH carrying SIB1 containing the CGI.

FIG. 11 shows a non-limiting example of how the reference frequency is configured within the report configuration information element (IE) in terms of an NR-ARFCN, where the new parameter is indicated in the bold font at reference 1150.

Embodiment Set #2 (Implicit Indication of Reference Frequency/Frequency Offset)

In this set of embodiments, the UE may determine the reference frequency $f_{REF}$ by knowledge of the set of synchronization raster points that are defined by specification for a certain operating band. Particularly for unlicensed frequency bands where the channelization is predefined (e.g., units of 20 MHz for the 5 GHz band), the set of synchronization raster points may be quite sparse, e.g., one or only a few per 20 MHz span. Since the UE is provided with the absolute frequency of the SS/PBCH on which to measure ($f_{SSB}$) there are likely only one or a small number of pre-defined raster points close to $f_{SSB}$.

The following provides a non-limiting example for determining the reference frequency $f_{REF}$:
  A method, implemented in a UE for obtaining a cell global identifier (CGI), in which the UE implicitly obtains N≥1 candidate reference frequencies $f_{REF}$:
    The UE implicitly obtains the candidate reference frequencies using one of the following alternative approaches. In all of the listed approaches, the synchronization raster frequencies are defined by specification for the particular operating frequency band The candidate reference frequencies are the N synchronization raster frequencies that are closest to the frequency position ($f_{SSB}$) of the SS/PBCH block on which the UE is configured to measure and report CGI. For example, the set of candidate reference frequencies may be within a threshold amount away from the frequency position ($f_{SSB}$) of the SS/PBCH block.

The candidate reference frequencies are the N synchronization raster frequencies, within the same sub-band/channel as frequency position ($f_{SSB}$) of the SS/PBCH block on which the UE is configured to measure and report CGI. For example, the UE may implicitly obtain a single candidate reference frequency, and the candidate reference frequency is the synchronization raster frequency within the same sub-band/channel as $f_{SSB}$ of the SS/PBCH block.

In some cases, the synchronization raster frequencies (and thus candidate reference frequencies) depend on the operating BW of the neighbor cell from which the UE should obtain the CGI. Because the operating BW of the neighbor cell is unknown to the UE, this might result in that N≥2. For this case, the UE starts with the candidate reference position that corresponds to the same operating BW as the serving cell. That is, if e.g., 20 MHz BW corresponds to frequency f1 and 40 MHz BW corresponds to f2 and the serving cell is using 40 MHz BW, the UE starts with f2.

For each candidate reference frequency:
The UE determines the frequency position of CORESET0 ($f_{CORESET0}$) using any of the procedures described above (e.g., Procedure A in FIG. 8 using $f_{REF}$), The UE attempts to decode a PDCCH in the Type0-PDCCH common search space associated with CORESET0, and The UE determines if the PDCCH CRC passes.

If the PDCCH corresponding to a particular candidate reference frequency passes CRC check, the UE decodes the PDSCH carrying SIB1 based on the scheduling information in the PDDCH in order to obtain CGI.

Note that the number (N) of synchronization raster frequencies is determined by standard specification with which a particular wireless network complies. The channelization, i.e., definition of channels and sub-bands, is specified by RAN4 (38.101-1). Furthermore, the synchronization raster frequencies (GSCN values) are also specified by RAN4 in 38.101-1. Hence, when the UE is signaled the frequency location of the SS/PBCH block, it will know in which channel/sub-band it is contained, and it will know which synchronization raster point(s) are contained in the same channel/sub-band.

Embodiments of the disclosures may be implemented in multiple operators operating concurrently in wireless networks in the same locale. For example, Operator A may use non-standalone deployment, meaning that in addition to deploying cell(s) in an unlicensed band, an "anchor" cell in a licensed band is deployed.

In this case, a UE belonging to the Operator A's network may perform the following:

The UE A performs initial access on the licensed cell and receives system information via that cell.

Once UE A is in the CONNECTED mode, the serving gNB configures the UE to perform CGI reporting and indicates an SSB frequency location ($f_{SSB}$) to measure to try to find a neighbor cell.

Note that $f_{SSB}$ can be flexibly located within a particular 20 MHz channel defined in the unlicensed band (In Rel-16, the unlicensed band is divided into 20 MHz channels to be consistent with WiFi). That is $f_{SSB}$ may be intentionally chosen to be different than the single synchronization raster point defined for that 20 MHz channel.

Assume that the 20 MHz channel has the center frequency $f_u$ (u corresponding to "unlicensed").

UE A determines the frequency location of CORESET0 for the neighbor cell using one of the embodiments disclosed herein above.

UE A reports CGI back to the network if it successfully decodes a PDCCH and is able to read SIB1 broadcasted from a neighbor cell which contains the CGI.

Operator B may use standalone deployment, meaning one or more cell(s) are deployed only in an unlicensed band. Assume that one of Operator B's cell(s) overlaps the 20 MHz channel with center frequency $f_u$ described above, and that a UE B (belonging to Operator B's network) performs initial access on this cell. This may happen, since for unlicensed operation, different operators share the same spectrum.

When UE B performs initial access, it will only look for an SSB at the single synchronization raster point defined in a 20 MHz channel. Because Operator A intentionally deploys its cells with SSB NOT on a synchronization raster point, UE B will not find an SSB transmitted by Operator A.

In this case, the use of the approaches disclosed herein in Operator A's network is beneficial, since UE B will not waste battery trying to receive Operator A's SSB, MIB, PDCCH, SIB1 only to find out that it is not allowed to join Operator A's network.

Operations in Some Embodiments

Figure 12A:
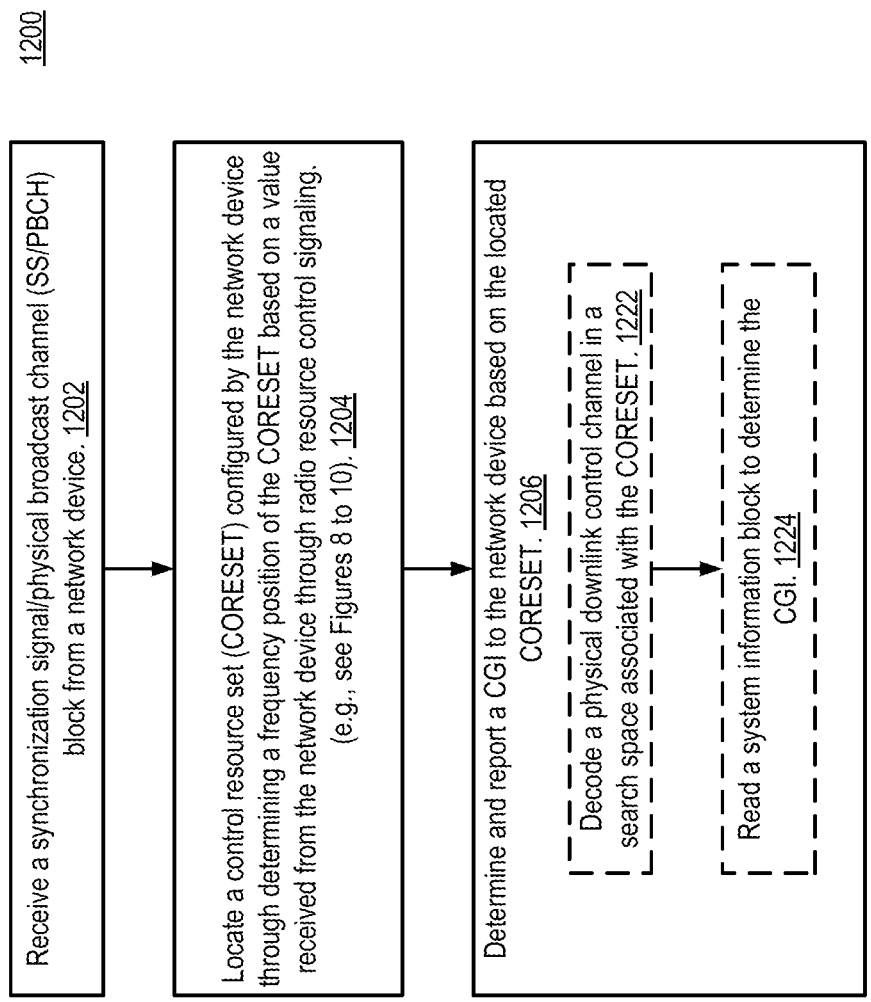
FIG. 12A illustrates operations at a wireless device when a reference frequency or frequency offset is provided explicitly for CGI reporting in accordance with some embodiments.

FIG. 12A illustrates operations at a wireless device when a reference frequency or frequency offset is provided explicitly for CGI reporting in accordance with some embodiments. The wireless device comprises the UEs discussed herein above.

At reference 1202, the wireless device receives a synchronization signal/physical broadcast channel (SS/PBCH) block from a network node. At reference 1204, the wireless device locates a control resource set (CORESET) configured by the network node through determining a frequency position of the CORESET based on a value received from the network node through radio resource control signaling. Then at reference 1206, the wireless device determines and reports a CGI to the network node based on the located CORESET.

In some embodiments, determining and reporting a CGI based on the located CORESET further comprises decoding a physical downlink control channel in a search space associated with the CORESET at reference 1222, and reading a system information block to determine the CGI at reference 1224.

In some embodiments, the value indicates a frequency offset (e.g., the $\Delta f_{REF}$ discussed herein) between the CORESET and the SS/PBCH block, where the frequency position of the CORESET is determined based on a subtraction of the frequency offset from the frequency position of the SS/PBCH block.

In some embodiments, the value directly indicates the frequency position of the CORESET (e.g., the $f_{REF}$ discussed relating to FIG. 10).

In some embodiments, the value indicates a reference frequency of a resource block boundary, and the frequency position of the CORESET is determined based on an offset, provided by a master information block (MIB) contained in the received SS/PBCH block, indicating a physical resource block offset between the reference frequency and a frequency of a lowest indexed subcarrier of the CORESET (see e.g., reference 854 of FIG. 8).

In some embodiments, the value indicates a reference frequency offset between a first and second resource block boundary, and the frequency position of the CORESET is determined based on the value, a first offset indicating a physical resource block offset between the first resource block boundary and a lowest indexed subcarrier of the CORESET, and a second offset indicating a difference between the second resource block boundary and a lowest indexed subcarrier of the SS/PBCH block, where the first and second offsets are provided by a master information block (MIB) contained in the received SS/PBCH block (see e.g., reference 852 of FIG. 8).

In some embodiments, the value indicates one of a reference frequency or a reference frequency offset, where the reference frequency is the frequency location of a hypothetically transmitted SS/PBCH block and the reference frequency offset is the frequency offset between the hypothetically transmitted SS/PBCH block and the received SS/PBCH block. The frequency position of the CORESET is determined based on a first offset indicating a physical resource block offset between a resource block boundary and a lowest indexed subcarrier of the CORESET, a second offset indicating a difference between the resource block boundary and a lowest indexed subcarrier of the hypothetically transmitted SS/PBCH block, and where the first and second offsets are provided by a master information block (MIB) contained in the received SS/PBCH block (see e.g., reference 954 of FIG. 9).

In some embodiments, the network node is a serving network node of the wireless device (e.g., the serving gNB), and the CGI is an identity of another network node (e.g., a neighbor cell).

In some embodiments, the value is provided in a report configuration information element (IE) received from the network node. Alternatively or additionally, the value may also be provided in a measurement object information element (IE) received from the network node.

In some embodiments, the value indicates a new radio absolute radio frequency channel number (ARFCN), a global synchronization channel number (GSCN), or a frequency expressed in Hz. In some embodiments, the value indicates a number of subcarriers, a number of resource blocks, or a number of physical resource blocks.

Figure 12B:
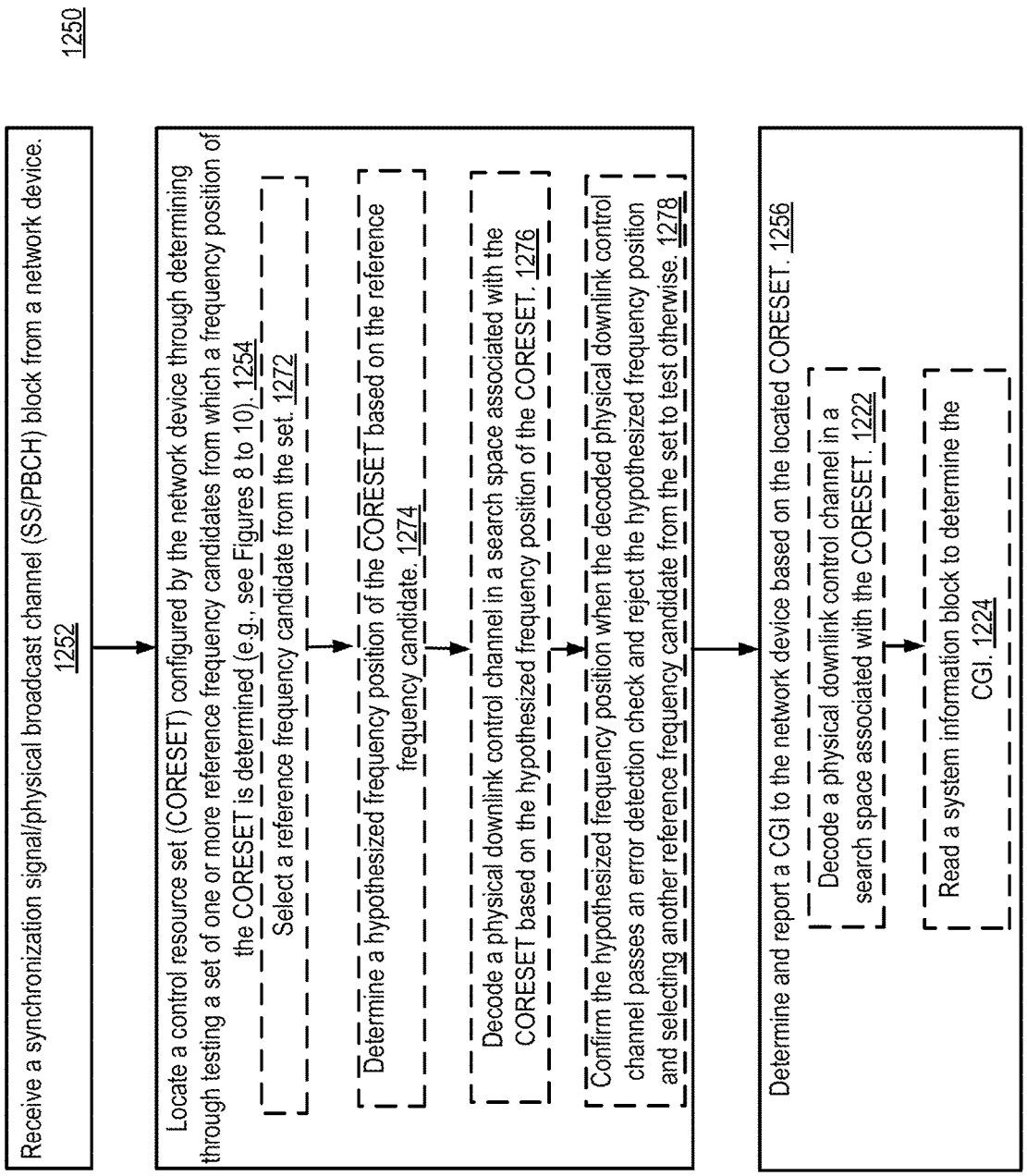
FIG. 12B illustrates operations at a wireless device when a reference frequency or frequency offset is provided implicitly for CGI reporting in accordance with some embodiments.

FIG. 12B illustrates operations at a wireless device when a reference frequency or frequency offset is provided implicitly for CGI reporting in accordance with some embodiments. The wireless device comprises the UEs discussed herein above.

At reference 1252, the wireless device receives a synchronization signal/physical broadcast channel (SS/PBCH) block from a network node. At reference 1254, the wireless device locates a control resource set (CORESET) configured by the network node through testing a set of one or more reference frequency candidates from which a frequency position of the CORESET is determined. Then at reference 1256, the wireless device determines and reports a CGI to the network node based on the located CORESET, similar to the operations at reference 1206 (e.g., with optional operations at references 1222 and 1224).

In some embodiments, testing the set of one or more reference frequency candidates comprises selecting a reference frequency candidate from the set at reference 1272; determining a hypothesized frequency position of the CORESET based on the reference frequency candidate at reference 1274; decoding a physical downlink control channel in a search space associated with the CORESET based on the hypothesized frequency position of the CORESET at reference 1276; and confirming the hypothesized frequency position when the decoded physical downlink control channel passes an error detection check, and rejecting the hypothesized frequency position and selecting another reference frequency candidate from the set to test otherwise at reference 1278.

In some embodiments, the set of one or more reference frequency candidates comprises a set of synchronization raster frequencies that are within a threshold amount away from the frequency position of the SS/PBCH block.

In some embodiments, the set of one or more reference frequency candidates comprises a set of synchronization raster frequencies within the same sub-band or channel as the frequency location of the SS/PBCH block. Specifically, the set of one or more reference frequency candidates may contain a single synchronization raster frequency within the same sub-band or channel as the frequency location of the SS/PBCH block.

In some embodiments, the number of reference frequency candidates in the set depends on the bandwidth of another network node, an identity of which is reported as the CGI, as explained in Embodiment Set #2.

In some embodiments, a reference frequency candidate corresponds to the frequency of a resource block boundary, and the frequency position of the CORESET is determined based on an offset, provided by a master information block (MIB) contained in the received SS/PBCH block, indicating a physical resource block offset between the resource block boundary and the frequency of a lowest indexed subcarrier of the CORESET (see, e.g., reference 854 of FIG. 8).

In some embodiments, a reference frequency candidate corresponds to the frequency location of a hypothetically transmitted SS/PBCH block, and the frequency position of the CORESET is determined based on a first offset indicating a physical resource block offset between a resource block boundary and a lowest indexed subcarrier of the CORESET, a second offset indicating a difference between the resource block boundary and a lowest indexed subcarrier of the hypothetically transmitted SS/PBCH block, and where the first and second offsets are provided by a master information block (MIB) contained in the received SS/PBCH block (see e.g., reference 954 of FIG. 9).

In some embodiments, determining and reporting the CGI based on the located CORESET further comprises reading a system information block to determine the CGI.

Figure 13:
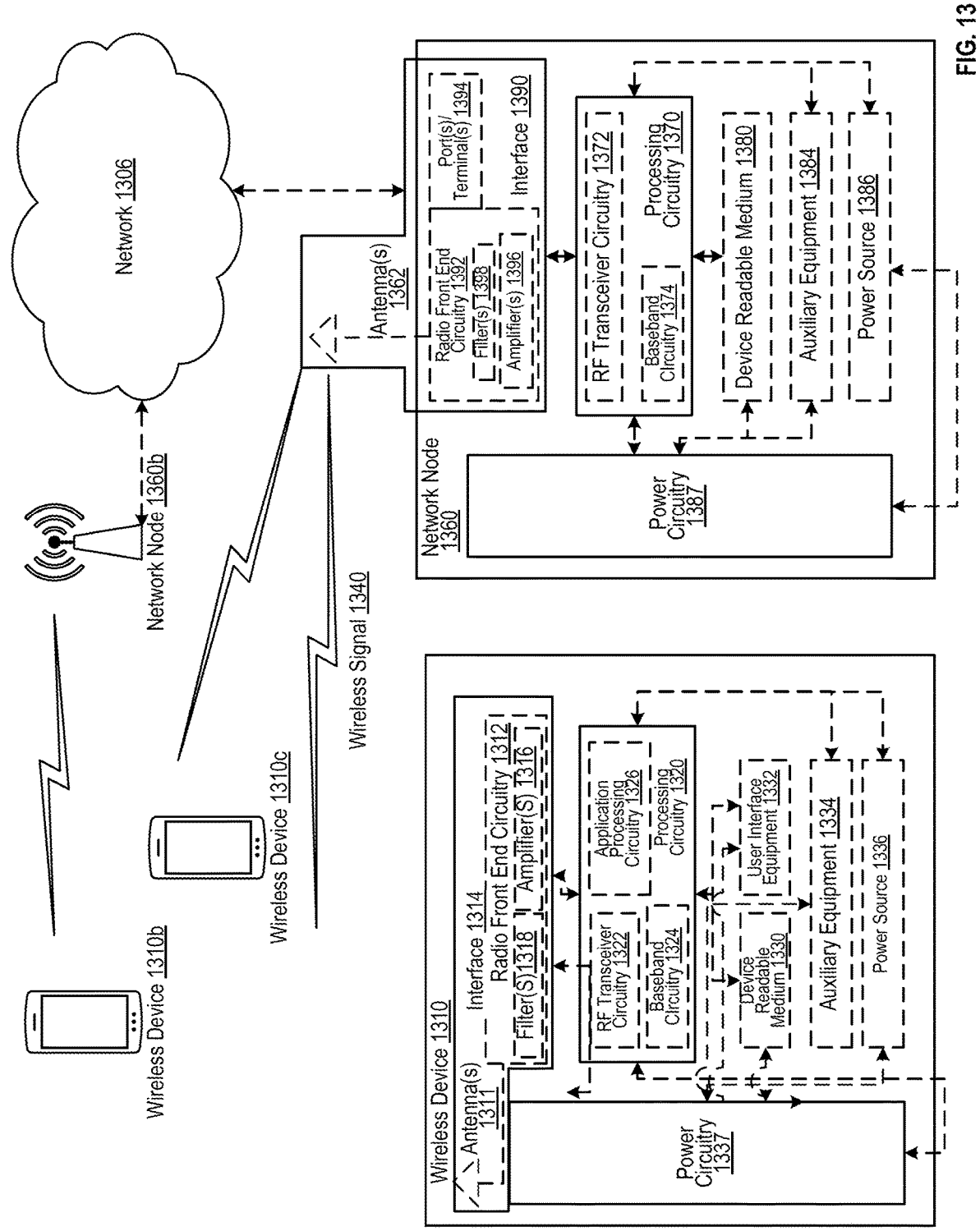
FIG. 13 illustrates a wireless network in accordance with some embodiments.

FIG. 13: A Wireless Network in Accordance with Some Embodiments.

Although the subject matter described herein may be implemented in any appropriate type of system using any suitable components, the embodiments disclosed herein are described in relation to a wireless network, such as the example wireless network illustrated in FIG. 13. For simplicity, the wireless network of FIG. 13 only depicts network

1306, network nodes 1360 and 1360*b*, and WDs 1310, 1310*b*, and 1310*c*. In practice, a wireless network may further include any additional elements suitable to support communication between wireless devices or between a wireless device and another communication device, such as a landline telephone, a service provider, or any other network node or end device. Of the illustrated components, network node 1360 and wireless device (WD) 1310 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1306 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1360 and WD 1310 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 13, network node 1360 includes processing circuitry 1370, device readable medium 1380, interface 1390, auxiliary equipment 1384, power source 1386, power circuitry 1387, and antenna 1362. Although network node 1360 illustrated in the example wireless network of FIG. 13 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1360 are depicted as single boxes located within a larger box, or nested within multiple boxes, in practice, a network node may comprise multiple different physical components that make up a single illustrated component (e.g., device readable medium 1380 may comprise multiple separate hard drives as well as multiple RAM modules).

Similarly, network node 1360 may be composed of multiple physically separate components (e.g., a NodeB component and a RNC component, or a BTS component and a BSC component, etc.), which may each have their own respective components. In certain scenarios in which network node 1360 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 1360 may be configured to support multiple radio access technologies (RATs). In such embodiments, some components may be duplicated (e.g., separate device readable medium 1380 for the different RATs) and some components may be reused (e.g., the same antenna 1362 may be shared by the RATs). Network node 1360 may also include multiple sets of the various illustrated components for different wireless technologies integrated into network node 1360, such as, for example, GSM, WCDMA, LTE, NR, WiFi, or Bluetooth wireless technologies. These wireless technologies may be integrated into the same or different chip or set of chips and other components within network node 1360.

Processing circuitry 1370 is configured to perform any determining, calculating, or similar operations (e.g., certain obtaining operations) described herein as being provided by a network node. These operations performed by processing circuitry 1370 may include processing information obtained by processing circuitry 1370 by, for example, converting the obtained information into other information, comparing the obtained information or converted information to information stored in the network node, and/or performing one or more operations based on the obtained information or converted information, and as a result of said processing making a determination.

Processing circuitry 1370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1360 components, such as device readable medium 1380, network node 1360 functionality. For example, processing circuitry 1370 may execute instructions stored in device readable medium 1380 or in memory within processing circuitry 1370. Such functionality may include providing any of the various wireless features, functions, or benefits discussed herein. In some embodiments, processing circuitry 1370 may include a system on a chip (SOC).

In some embodiments, processing circuitry 1370 may include one or more of radio frequency (RF) transceiver circuitry 1372 and baseband processing circuitry 1374. In some embodiments, radio frequency (RF) transceiver circuitry 1372 and baseband processing circuitry 1374 may be on separate chips (or sets of chips), boards, or units, such as radio units and digital units. In alternative embodiments, part or all of RF transceiver circuitry 1372 and baseband processing circuitry 1374 may be on the same chip or set of chips, boards, or units.

In certain embodiments, some or all of the functionality described herein as being provided by a network node, base station, eNB or other such network device may be performed by processing circuitry 1370 executing instructions stored on device readable medium 1380 or memory within processing circuitry 1370. In alternative embodiments, some or all of the functionality may be provided by processing circuitry 1370 without executing instructions stored on a separate or discrete device readable medium, such as in a hard-wired manner. In any of those embodiments, whether executing instructions stored on a device readable storage medium or not, processing circuitry 1370 can be configured to perform the described functionality. The benefits provided by such functionality are not limited to processing circuitry 1370 alone or to other components of network node 1360, but are enjoyed by network node 1360 as a whole, and/or by end users and the wireless network generally.

Device readable medium 1380 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1370. Device readable medium 1380 may store any suitable instructions, data or information, including a computer program, software, an application including one or more of logic, rules, code, tables, etc. and/or other instructions capable of being executed by processing circuitry 1370 and, utilized by network node 1360. Device readable medium 1380 may be used to store any calculations made by processing circuitry 1370 and/or any data received via interface 1390. In some embodiments, processing circuitry 1370 and device readable medium 1380 may be considered to be integrated.

Interface 1390 is used in the wired or wireless communication of signaling and/or data between network node 1360, network 1306, and/or WDs 1310. As illustrated, interface 1390 comprises port(s)/terminal(s) 1394 to send and receive data, for example to and from network 1306 over a wired connection. Interface 1390 also includes radio front end circuitry 1392 that may be coupled to, or in certain embodiments a part of, antenna 1362. Radio front end circuitry 1392 comprises filters 1398 and amplifiers 1396. Radio front end circuitry 1392 may be connected to antenna 1362 and processing circuitry 1370. Radio front end circuitry may be configured to condition signals communicated between antenna 1362 and processing circuitry 1370. Radio front end circuitry 1392 may receive digital data that is to be sent out to other network nodes or WDs via a wireless connection. Radio front end circuitry 1392 may convert the digital data into a radio signal having the appropriate channel and bandwidth parameters using a combination of filters 1398 and/or amplifiers 1396. The radio signal may then be transmitted via antenna 1362. Similarly, when receiving data, antenna 1362 may collect radio signals which are then converted into digital data by radio front end circuitry 1392. The digital data may be passed to processing circuitry 1370. In other embodiments, the interface may comprise different components and/or different combinations of components.

In certain alternative embodiments, network node 1360 may not include separate radio front end circuitry 1392, instead, processing circuitry 1370 may comprise radio front end circuitry and may be connected to antenna 1362 without separate radio front end circuitry 1392. Similarly, in some embodiments, all or some of RF transceiver circuitry 1372 may be considered a part of interface 1390. In still other embodiments, interface 1390 may include one or more ports or terminals 1394, radio front end circuitry 1392, and RF transceiver circuitry 1372, as part of a radio unit (not shown), and interface 1390 may communicate with baseband processing circuitry 1374, which is part of a digital unit (not shown).

Antenna 1362 may include one or more antennas, or antenna arrays, configured to send and/or receive wireless signals. Antenna 1362 may be coupled to radio front end circuitry 1390 and may be any type of antenna capable of transmitting and receiving data and/or signals wirelessly. In some embodiments, antenna 1362 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1362 may be separate from network node 1360 and may be connectable to network node 1360 through an interface or port.

Antenna 1362, interface 1390, and/or processing circuitry 1370 may be configured to perform any receiving operations and/or certain obtaining operations described herein as being performed by a network node. Any information, data and/or signals may be received from a wireless device, another network node and/or any other network equipment. Similarly, antenna 1362, interface 1390, and/or processing circuitry 1370 may be configured to perform any transmitting operations described herein as being performed by a network node. Any information, data and/or signals may be transmitted to a wireless device, another network node and/or any other network equipment.

Power circuitry 1387 may comprise, or be coupled to, power management circuitry and is configured to supply the components of network node 1360 with power for performing the functionality described herein. Power circuitry 1387 may receive power from power source 1386. Power source 1386 and/or power circuitry 1387 may be configured to provide power to the various components of network node 1360 in a form suitable for the respective components (e.g., at a voltage and current level needed for each respective component). Power source 1386 may either be included in, or external to, power circuitry 1387 and/or network node 1360. For example, network node 1360 may be connectable to an external power source (e.g., an electricity outlet) via an input circuitry or interface such as an electrical cable, whereby the external power source supplies power to power circuitry 1387. As a further example, power source 1386 may comprise a source of power in the form of a battery or battery pack which is connected to, or integrated in, power circuitry 1387. The battery may provide backup power should the external power source fail. Other types of power sources, such as photovoltaic devices, may also be used.

Alternative embodiments of network node 1360 may include additional components beyond those shown in FIG. 13 that may be responsible for providing certain aspects of the network node's functionality, including any of the functionality described herein and/or any functionality necessary to support the subject matter described herein. For example, network node 1360 may include user interface equipment to allow input of information into network node 1360 and to allow output of information from network node 1360. This may allow a user to perform diagnostic, maintenance, repair, and other administrative functions for network node 1360.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1310 includes antenna 1311, interface 1314, processing circuitry 1320, device readable medium 1330, user interface equipment 1332, auxiliary equipment 1334, power source 1336 and power circuitry 1337. WD 1310 may include multiple sets of one or more of the illustrated components for different wireless technologies supported by WD 1310, such as, for example, GSM, WCDMA, LTE, NR, WiFi, WiMAX, or Bluetooth wireless technologies, just to mention a few. These wireless technologies may be integrated into the same or different chips or set of chips as other components within WD 1310.

Antenna 1311 may include one or more antennas or antenna arrays, configured to send and/or receive wireless signals, and is connected to interface 1314. In certain alternative embodiments, antenna 1311 may be separate from WD 1310 and be connectable to WD 1310 through an interface or port. Antenna 1311, interface 1314, and/or processing circuitry 1320 may be configured to perform any receiving or transmitting operations described herein as being performed by a WD. Any information, data and/or signals may be received from a network node and/or another WD. In some embodiments, radio front end circuitry and/or antenna 1311 may be considered an interface.

As illustrated, interface 1314 comprises radio front end circuitry 1312 and antenna 1311. Radio front end circuitry 1312 comprise one or more filters 1318 and amplifiers 1316. Radio front end circuitry 1314 is connected to antenna 1311 and processing circuitry 1320, and is configured to condition signals communicated between antenna 1311 and processing circuitry 1320. Radio front end circuitry 1312 may be coupled to or a part of antenna 1311. In some embodiments, WD 1310 may not include separate radio front end circuitry 1312; rather, processing circuitry 1320 may comprise radio front end circuitry and may be connected to antenna 1311. Similarly, in some embodiments, some or all of RF transceiver circuitry 1322 may be considered a part of interface 1314. Radio front end circuitry 1312 may receive digital data that is to be sent out to other network nodes or WDs via a wireless connection. Radio front end circuitry 1312 may convert the digital data into a radio signal having the appropriate channel and bandwidth parameters using a combination of filters 1318 and/or amplifiers 1316. The radio signal may then be transmitted via antenna 1311. Similarly, when receiving data, antenna 1311 may collect radio signals which are then converted into digital data by radio front end circuitry 1312. The digital data may be passed to processing circuitry 1320. In other embodiments, the interface may comprise different components and/or different combinations of components.

Processing circuitry 1320 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1310 components, such as device readable medium 1330, WD 1310 functionality. Such functionality may include providing any of the various wireless features or benefits discussed herein. For example, processing circuitry 1320 may execute instructions stored in device readable medium 1330 or in memory within processing circuitry 1320 to provide the functionality disclosed herein.

As illustrated, processing circuitry 1320 includes one or more of RF transceiver circuitry 1322, baseband processing circuitry 1324, and application processing circuitry 1326. In other embodiments, the processing circuitry may comprise different components and/or different combinations of components. In certain embodiments processing circuitry 1320 of WD 1310 may comprise a SOC. In some embodiments, RF transceiver circuitry 1322, baseband processing circuitry 1324, and application processing circuitry 1326 may be on separate chips or sets of chips. In alternative embodiments, part or all of baseband processing circuitry 1324 and application processing circuitry 1326 may be combined into one chip or set of chips, and RF transceiver circuitry 1322 may be on a separate chip or set of chips. In still alternative embodiments, part or all of RF transceiver circuitry 1322 and baseband processing circuitry 1324 may be on the same chip or set of chips, and application processing circuitry 1326 may be on a separate chip or set of chips. In yet other alternative embodiments, part or all of RF transceiver circuitry 1322, baseband processing circuitry 1324, and application processing circuitry 1326 may be combined in the same chip or set of chips. In some embodiments, RF transceiver circuitry 1322 may be a part of interface 1314. RF transceiver circuitry 1322 may condition RF signals for processing circuitry 1320.

In certain embodiments, some or all of the functionality described herein as being performed by a WD may be provided by processing circuitry 1320 executing instructions stored on device readable medium 1330, which in certain embodiments may be a computer-readable storage medium. In alternative embodiments, some or all of the functionality may be provided by processing circuitry 1320 without executing instructions stored on a separate or discrete device readable storage medium, such as in a hard-wired manner. In any of those particular embodiments, whether executing instructions stored on a device readable storage medium or not, processing circuitry 1320 can be configured to perform the described functionality. The benefits provided by such functionality are not limited to processing circuitry 1320 alone or to other components of WD 1310, but are enjoyed by WD 1310 as a whole, and/or by end users and the wireless network generally.

Processing circuitry 1320 may be configured to perform any determining, calculating, or similar operations (e.g., certain obtaining operations) described herein as being performed by a WD. These operations, as performed by processing circuitry 1320, may include processing information obtained by processing circuitry 1320 by, for example, converting the obtained information into other information, comparing the obtained information or converted information to information stored by WD 1310, and/or performing one or more operations based on the obtained information or converted information, and as a result of said processing making a determination.

Device readable medium 1330 may be operable to store a computer program, software, an application including one or more of logic, rules, code, tables, etc. and/or other instructions capable of being executed by processing circuitry 1320. Device readable medium 1330 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1320. In some embodiments, processing circuitry 1320 and device readable medium 1330 may be considered to be integrated.

User interface equipment 1332 may provide components that allow for a human user to interact with WD 1310. Such interaction may be of many forms, such as visual, audial, tactile, etc. User interface equipment 1332 may be operable to produce output to the user and to allow the user to provide input to WD 1310. The type of interaction may vary depending on the type of user interface equipment 1332 installed in WD 1310. For example, if WD 1310 is a smart phone, the interaction may be via a touch screen; if WD 1310 is a smart meter, the interaction may be through a screen that provides usage (e.g., the number of gallons used) or a speaker that provides an audible alert (e.g., if smoke is detected). User interface equipment 1332 may include input interfaces, devices and circuits, and output interfaces, devices and circuits. User interface equipment 1332 is configured to allow input of information into WD 1310, and is connected to processing circuitry 1320 to allow processing circuitry 1320 to process the input information. User interface equipment 1332 may include, for example, a microphone, a proximity or other sensor, keys/buttons, a touch display, one or more cameras, a USB port, or other input circuitry. User interface equipment 1332 is also configured to allow output of information from WD 1310, and to allow processing circuitry 1320 to output information from WD 1310. User interface equipment 1332 may include, for example, a speaker, a display, vibrating circuitry, a USB port, a headphone interface, or other output circuitry. Using one or more input and output interfaces, devices, and circuits, of user interface equipment 1332, WD 1310 may communicate with end users and/or the wireless network, and allow them to benefit from the functionality described herein.

Auxiliary equipment 1334 is operable to provide more specific functionality which may not be generally performed by WDs. This may comprise specialized sensors for doing measurements for various purposes, interfaces for additional types of communication such as wired communications etc. The inclusion and type of components of auxiliary equipment 1334 may vary depending on the embodiment and/or scenario.

Power source 1336 may, in some embodiments, be in the form of a battery or battery pack. Other types of power sources, such as an external power source (e.g., an electricity outlet), photovoltaic devices or power cells, may also be used. WD 1310 may further comprise power circuitry 1337 for delivering power from power source 1336 to the various parts of WD 1310 which need power from power source 1336 to carry out any functionality described or indicated herein. Power circuitry 1337 may in certain embodiments comprise power management circuitry. Power circuitry 1337 may additionally or alternatively be operable to receive power from an external power source; in which case WD 1310 may be connectable to the external power source (such as an electricity outlet) via input circuitry or an interface such as an electrical power cable. Power circuitry 1337 may also in certain embodiments be operable to deliver power from an external power source to power source 1336. This may be, for example, for the charging of power source 1336. Power circuitry 1337 may perform any formatting, converting, or other modification to the power from power source 1336 to make the power suitable for the respective components of WD 1310 to which power is supplied.

Figure 14:
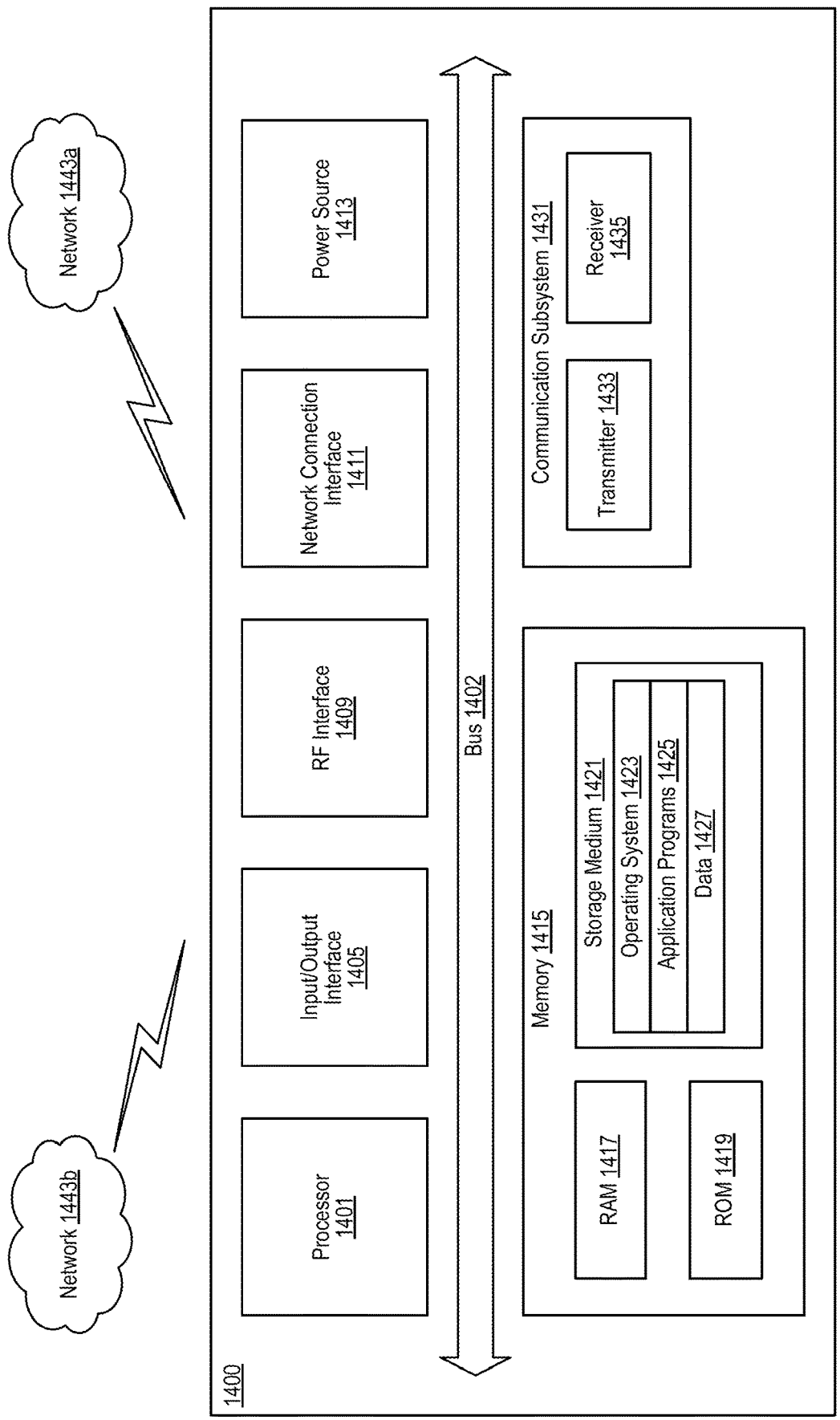
FIG. 14 illustrates User Equipment in accordance with some embodiments.

FIG. 14: User Equipment in Accordance with Some Embodiments

FIG. 14 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 14200 may be any UE identified by the $3^{rd}$ Generation Partnership Project (3GPP), including a NB-IoT UE, a machine type communication (MTC) UE, and/or an enhanced MTC (eMTC) UE. UE 1400, as illustrated in FIG. 14, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 14 is a UE, the components discussed herein are equally applicable to a WD, and vice-versa.

In FIG. 14, UE 1400 includes processing circuitry 1401 that is operatively coupled to input/output interface 1405, radio frequency (RF) interface 1409, network connection interface 1411, memory 1415 including random access memory (RAM) 1417, read-only memory (ROM) 1419, and storage medium 1421 or the like, communication subsystem 1431, power source 1433, and/or any other component, or any combination thereof. Storage medium 1421 includes operating system 1423, application program 1425, and data 1427. In other embodiments, storage medium 1421 may include other similar types of information. Certain UEs may utilize all of the components shown in FIG. 14, or only a subset of the components. The level of integration between the components may vary from one UE to another UE. Further, certain UEs may contain multiple instances of a component, such as multiple processors, memories, transceivers, transmitters, receivers, etc.

In FIG. 14, processing circuitry 1401 may be configured to process computer instructions and data. Processing circuitry 1401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1401 may include two central processing units (CPUs). Data may be information in a form suitable for use by a computer.

In the depicted embodiment, input/output interface 1405 may be configured to provide a communication interface to an input device, output device, or input and output device. UE 1400 may be configured to use an output device via input/output interface 1405. An output device may use the same type of interface port as an input device. For example, a USB port may be used to provide input to and output from UE 1400. The output device may be a speaker, a sound card, a video card, a display, a monitor, a printer, an actuator, an emitter, a smartcard, another output device, or any combination thereof. UE 1400 may be configured to use an input device via input/output interface 1405 to allow a user to capture information into UE 1400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 14, RF interface 1409 may be configured to provide a communication interface to RF components such as a transmitter, a receiver, and an antenna. Network connection interface 1411 may be configured to provide a communication interface to network 1443*a*. Network 1443*a* may encompass wired and/or wireless networks such as a local-area network (LAN), a wide-area network (WAN), a computer network, a wireless network, a telecommunications network, another like network or any combination thereof. For example, network 1443*a* may comprise a Wi-Fi network. Network connection interface 1411 may be configured to include a receiver and a transmitter interface used to communicate with one or more other devices over a communication network according to one or more communication protocols, such as Ethernet, TCP/IP, SONET, ATM, or the like. Network connection interface 1411 may implement receiver and transmitter functionality appropriate to the communication network links (e.g., optical, electrical, and the like). The transmitter and receiver functions may share circuit components, software or firmware, or alternatively may be implemented separately.

RAM 1417 may be configured to interface via bus 1402 to processing circuitry 1401 to provide storage or caching of data or computer instructions during the execution of software programs such as the operating system, application programs, and device drivers. ROM 1419 may be configured to provide computer instructions or data to processing circuitry 1401. For example, ROM 1419 may be configured to store invariant low-level system code or data for basic system functions such as basic input and output (I/O), startup, or reception of keystrokes from a keyboard that are stored in a non-volatile memory. Storage medium 1421 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1421 may be configured to include operating system 1423, application program 1425 such as a web browser application, a widget or gadget engine or another application, and data file 1427. Storage medium 1421 may store, for use by UE 1400, any of a variety of various operating systems or combinations of operating systems.

Storage medium 1421 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1421 may allow UE 1400 to access computer-executable instructions, application programs or the like, stored on transitory or non-transitory memory media, to off-load data, or to upload data. An article of manufacture, such as one utilizing a communication system may be tangibly embodied in storage medium 1421, which may comprise a device readable medium.

In FIG. 14, processing circuitry 1401 may be configured to communicate with network 1443b using communication subsystem 1431. Network 1443a and network 1443b may be the same network or networks or different network or networks. Communication subsystem 1431 may be configured to include one or more transceivers used to communicate with network 1443b. For example, communication subsystem 1431 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1433 and/or receiver 1435 to implement transmitter or receiver functionality, respectively, appropriate to the RAN links (e.g., frequency allocations and the like). Further, transmitter 1433 and receiver 1435 of each transceiver may share circuit components, software or firmware, or alternatively may be implemented separately.

In the illustrated embodiment, the communication functions of communication subsystem 1431 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1431 may include cellular communication, Wi-Fi communication, Bluetooth communication, and GPS communication. Network 1443b may encompass wired and/or wireless networks such as a local-area network (LAN), a wide-area network (WAN), a computer network, a wireless network, a telecommunications network, another like network or any combination thereof. For example, network 1443b may be a cellular network, a Wi-Fi network, and/or a near-field network. Power source 1413 may be configured to provide alternating current (AC) or direct current (DC) power to components of UE 1400.

The features, benefits and/or functions described herein may be implemented in one of the components of UE 1400 or partitioned across multiple components of UE 1400. Further, the features, benefits, and/or functions described herein may be implemented in any combination of hardware, software or firmware. In one example, communication subsystem 1431 may be configured to include any of the components described herein. Further, processing circuitry 1401 may be configured to communicate with any of such components over bus 1402. In another example, any of such components may be represented by program instructions stored in memory that when executed by processing circuitry 1401 perform the corresponding functions described herein. In another example, the functionality of any of such components may be partitioned between processing circuitry 1401 and communication subsystem 1431. In another example, the non-computationally intensive functions of any of such components may be implemented in software or firmware and the computationally intensive functions may be implemented in hardware.

Figure 15:
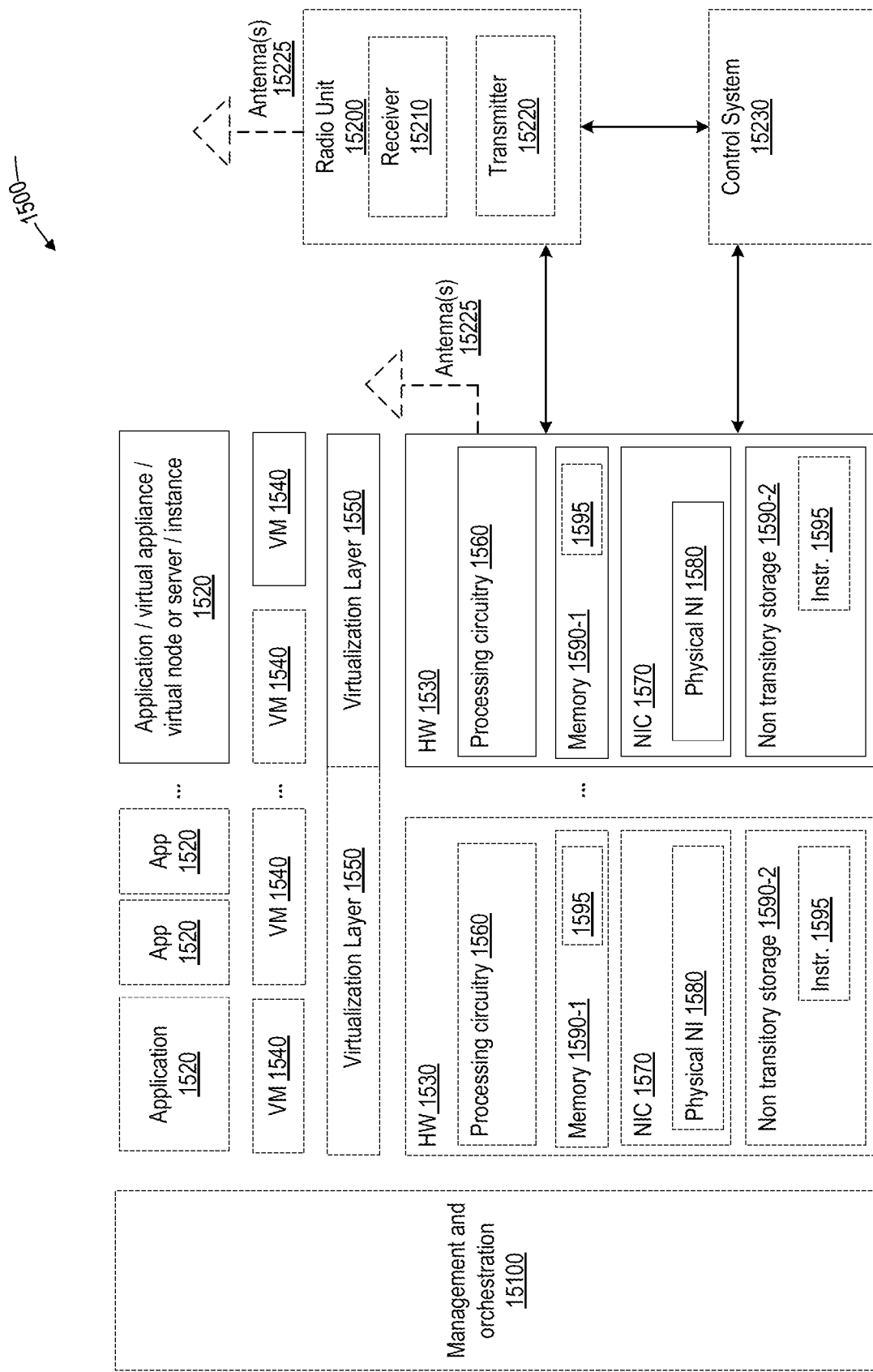
FIG. 15 illustrates virtualization environment in accordance with some embodiments.

FIG. 15: Virtualization Environment in Accordance with Some Embodiments

FIG. 15 is a schematic block diagram illustrating a virtualization environment 1500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1500 hosted by one or more of hardware nodes 1530. Further, in embodiments in which the virtual node is not a radio access node or does not require radio connectivity (e.g., a core network node), then the network node may be entirely virtualized.

The functions may be implemented by one or more applications 1520 (which may alternatively be called software instances, virtual appliances, network functions, virtual nodes, virtual network functions, etc.) operative to implement some of the features, functions, and/or benefits of some of the embodiments disclosed herein. Applications 1520 are run in virtualization environment 1500 which provides hardware 1530 comprising processing circuitry 1560 and memory 1590. Memory 1590 contains instructions 1595 executable by processing circuitry 1560 whereby application 1520 is operative to provide one or more of the features, benefits, and/or functions disclosed herein.

Virtualization environment 1500, comprises general-purpose or special-purpose network hardware devices 1530 comprising a set of one or more processors or processing circuitry 1560, which may be commercial off-the-shelf (COTS) processors, dedicated Application Specific Integrated Circuits (ASICs), or any other type of processing circuitry including digital or analog hardware components or special purpose processors. Each hardware device may comprise memory 1590-1 which may be non-persistent memory for temporarily storing instructions 1595 or software executed by processing circuitry 1560. Each hardware device may comprise one or more network interface controllers (NICs) 1570, also known as network interface cards, which include physical network interface 1580. Each hardware device may also include non-transitory, persistent, machine-readable storage media 1590-2 having stored therein software 1595 and/or instructions executable by processing circuitry 1560. Software 1595 may include any type of software including software for instantiating one or more virtualization layers 1550 (also referred to as hypervisors), software to execute virtual machines 1540 as well as software allowing it to execute functions, features and/or benefits described in relation with some embodiments described herein.

Virtual machines 1540, comprise virtual processing, virtual memory, virtual networking or interface and virtual storage, and may be run by a corresponding virtualization layer 1550 or hypervisor. Different embodiments of the instance of virtual appliance 1520 may be implemented on one or more of virtual machines 1540, and the implementations may be made in different ways.

During operation, processing circuitry 1560 executes software 1595 to instantiate the hypervisor or virtualization layer 1550, which may sometimes be referred to as a virtual machine monitor (VMM). Virtualization layer 1550 may present a virtual operating platform that appears like networking hardware to virtual machine 1540.

As shown in FIG. 15, hardware 1530 may be a standalone network node with generic or specific components. Hardware 1530 may comprise antenna 15225 and may implement some functions via virtualization. Alternatively, hardware 1530 may be part of a larger cluster of hardware (e.g., such as in a data center or customer premise equipment (CPE)) where many hardware nodes work together and are managed via management and orchestration (MANO) 15100, which, among others, oversees lifecycle management of applications 1520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1540 may be a software implementation of a physical machine that runs programs as if they were executing on a physical, non-virtualized machine. Each of virtual machines 1540, and that part of hardware 1530 that executes that virtual machine, be it hardware dedicated to that virtual machine and/or hardware shared by that virtual machine with others of the virtual machines 1540, forms a separate virtual network elements (VNE).

Still in the context of NFV, Virtual Network Function (VNF) is responsible for handling specific network functions that run in one or more virtual machines 1540 on top of hardware networking infrastructure 1530 and corresponds to application 1520 in FIG. 15.

In some embodiments, one or more radio units 15200 that each include one or more transmitters 15220 and one or more receivers 15210 may be coupled to one or more antennas 15225. Radio units 15200 may communicate directly with hardware nodes 1530 via one or more appropriate network interfaces and may be used in combination with the virtual components to provide a virtual node with radio capabilities, such as a radio access node or a base station.

In some embodiments, some signaling can be effected with the use of control system 15230 which may alternatively be used for communication between the hardware nodes 1530 and radio units 15200.

Figure 16:
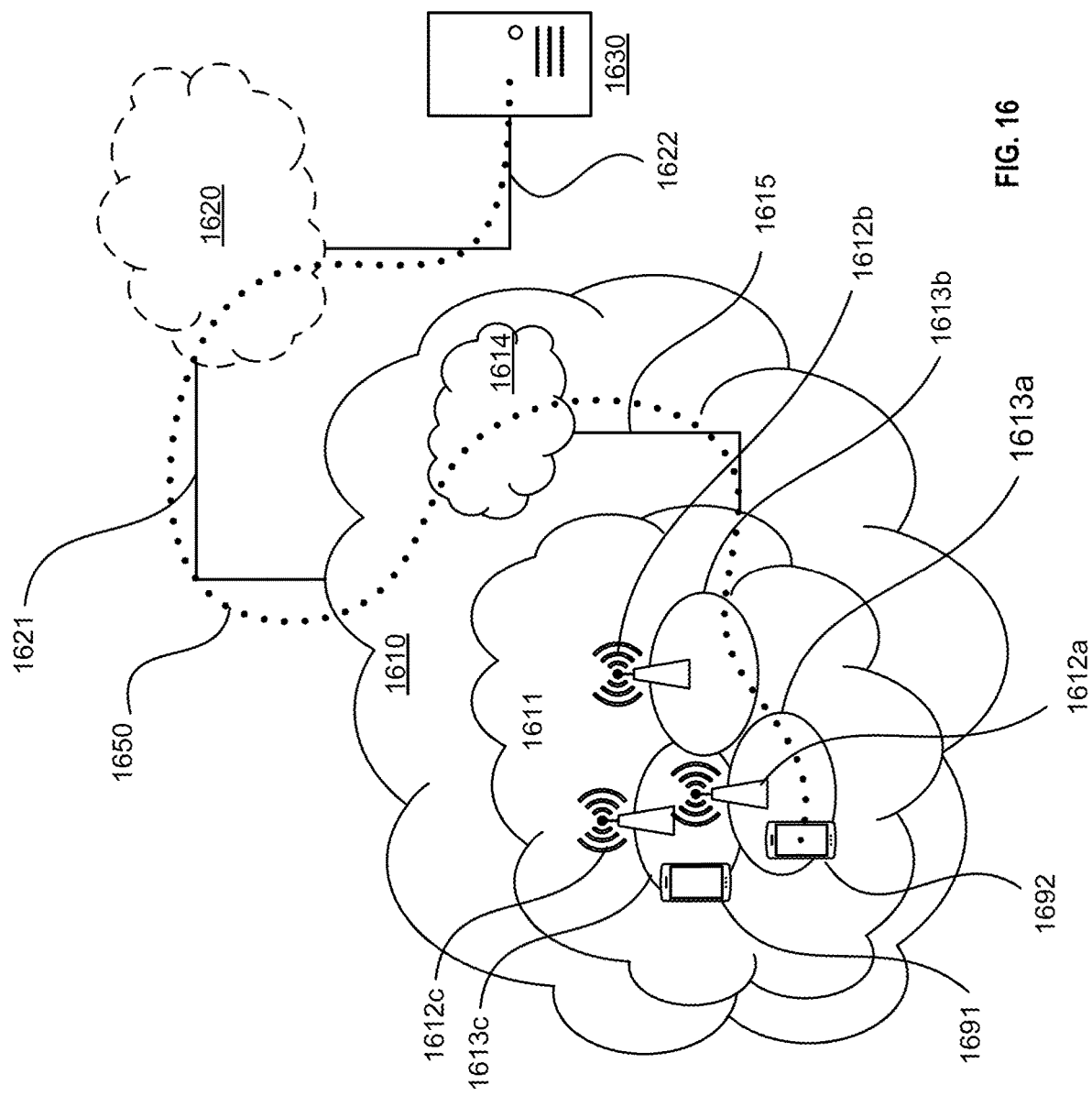
FIG. 16 illustrates telecommunication network connected via an intermediate network to a host computer in accordance with some embodiments.

FIG. 16: Telecommunication Network Connected Via an Intermediate Network to a Host Computer in Accordance with Some Embodiments With reference to FIG. 16, in accordance with an embodiment, a communication system includes telecommunication network 1610, such as a 3GPP-type cellular network, which comprises access network 1611, such as a radio access network, and core network 1614. Access network 1611 comprises a plurality of base stations 1612*a*, 1612*b*, 1612*c*, such as NBs, eNBs, gNBs or other types of wireless access points, each defining a corresponding coverage area 1613*a*, 1613*b*, 1613*c*. Each base station 1612*a*, 1612*b*, 1612*c* is connectable to core network 1614 over a wired or wireless connection 1615. A first UE 1691 located in coverage area 1613*c* is configured to wirelessly connect to, or be paged by, the corresponding base station 1612*c*. A second UE 1692 in coverage area 1613*a* is wirelessly connectable to the corresponding base station 1612*a*. While a plurality of UEs 1691, 1692 are illustrated in this example, the disclosed embodiments are equally applicable to a situation where a sole UE is in the coverage area or where a sole UE is connecting to the corresponding base station 1612.

Telecommunication network 1610 is itself connected to host computer 1630, which may be embodied in the hardware and/or software of a standalone server, a cloud-implemented server, a distributed server or as processing resources in a server farm. Host computer 1630 may be under the ownership or control of a service provider, or may be operated by the service provider or on behalf of the service provider. Connections 1621 and 1622 between telecommunication network 1610 and host computer 1630 may extend directly from core network 1614 to host computer 1630 or may go via an optional intermediate network 1620. Intermediate network 1620 may be one of, or a combination of more than one of, a public, private or hosted network; intermediate network 1620, if any, may be a backbone network or the Internet; in particular, intermediate network 1620 may comprise two or more sub-networks (not shown).

The communication system of FIG. 16 as a whole enables connectivity between the connected UEs 1691, 1692 and host computer 1630. The connectivity may be described as an over-the-top (OTT) connection 1650. Host computer 1630 and the connected UEs 1691, 1692 are configured to communicate data and/or signaling via OTT connection 1650, using access network 1611, core network 1614, any intermediate network 1620 and possible further infrastructure (not shown) as intermediaries. OTT connection 1650 may be transparent in the sense that the participating communication devices through which OTT connection 1650 passes are unaware of routing of uplink and downlink communications. For example, base station 1612 may not or need not be informed about the past routing of an incoming downlink communication with data originating from host computer 1630 to be forwarded (e.g., handed over) to a connected UE 1691. Similarly, base station 1612 need not be aware of the future routing of an outgoing uplink communication originating from the UE 1691 towards the host computer 1630.

Figure 17:
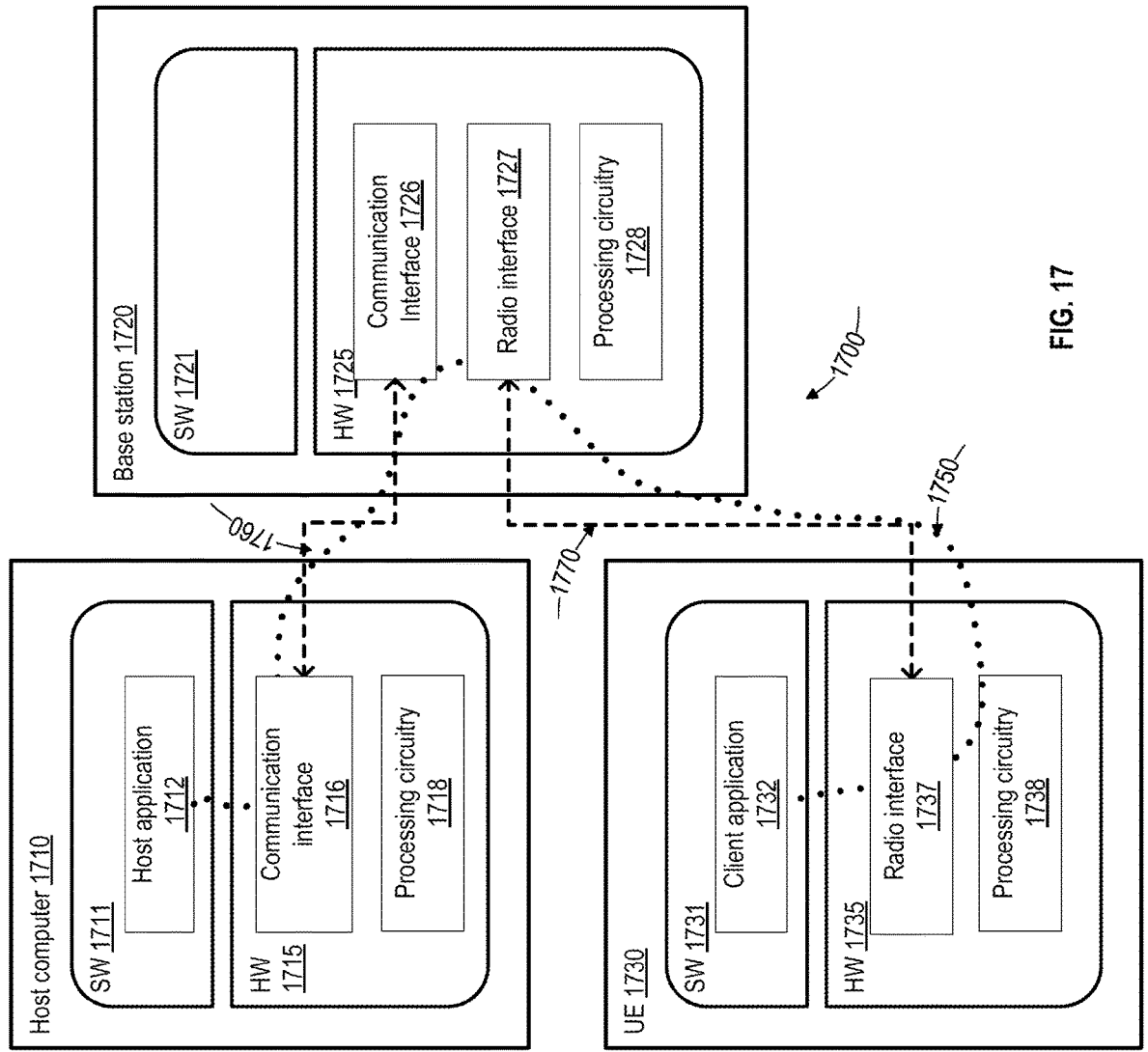
FIG. 17 illustrates host computer communicating via a base station with a user equipment over a partially wireless connection in accordance with some embodiments.

FIG. 17: Host Computer Communicating Via a Base Station with a User Equipment Over a Partially Wireless Connection in Accordance with Some Embodiments Example implementations, in accordance with an embodiment, of the UE, base station and host computer discussed in the preceding paragraphs will now be described with reference to FIG. 17. In communication system 1700, host computer 1710 comprises hardware 1715 including communication interface 1716 configured to set up and maintain a wired or wireless connection with an interface of a different communication device of communication system 1700. Host computer 1710 further comprises processing circuitry 1718, which may have storage and/or processing capabilities. In particular, processing circuitry 1718 may comprise one or more programmable processors, application-specific integrated circuits, field programmable gate arrays or combinations of these (not shown) adapted to execute instructions. Host computer 1710 further comprises software 1711, which is stored in or accessible by host computer 1710 and executable by processing circuitry 1718. Software 1711 includes host application 1712. Host application 1712 may be operable to provide a service to a remote user, such as UE 1730 connecting via OTT connection 1750 terminating at UE 1730 and host computer 1710. In providing the service to the remote user, host application 1712 may provide user data which is transmitted using OTT connection 1750.

Communication system 1700 further includes base station 1720 provided in a telecommunication system and comprising hardware 1725 enabling it to communicate with host computer 1710 and with UE 1730. Hardware 1725 may include communication interface 1726 for setting up and maintaining a wired or wireless connection with an interface of a different communication device of communication system 1700, as well as radio interface 1727 for setting up and maintaining at least wireless connection 1770 with UE 1730 located in a coverage area (not shown in FIG. 17) served by base station 1720. Communication interface 1726 may be configured to facilitate connection 1760 to host computer 1710. Connection 1760 may be direct or it may pass through a core network (not shown in FIG. 17) of the telecommunication system and/or through one or more intermediate networks outside the telecommunication system. In the embodiment shown, hardware 1725 of base station 1720 further includes processing circuitry 1728, which may comprise one or more programmable processors, application-specific integrated circuits, field programmable gate arrays or combinations of these (not shown) adapted to execute instructions. Base station 1720 further has software 1721 stored internally or accessible via an external connection.

Communication system 1700 further includes UE 1730 already referred to. Its hardware 1735 may include radio interface 1737 configured to set up and maintain wireless connection 1770 with a base station serving a coverage area in which UE 1730 is currently located. Hardware 1735 of UE 1730 further includes processing circuitry 1738, which may comprise one or more programmable processors, application-specific integrated circuits, field programmable gate arrays or combinations of these (not shown) adapted to execute instructions. UE 1730 further comprises software 1731, which is stored in or accessible by UE 1730 and executable by processing circuitry 1738. Software 1731 includes client application 1732. Client application 1732 may be operable to provide a service to a human or non-human user via UE 1730, with the support of host computer 1710. In host computer 1710, an executing host application 1712 may communicate with the executing client application 1732 via OTT connection 1750 terminating at UE 1730 and host computer 1710. In providing the service to the user, client application 1732 may receive request data from host application 1712 and provide user data in response to the request data. OTT connection 1750 may transfer both the request data and the user data. Client application 1732 may interact with the user to generate the user data that it provides.

It is noted that host computer 1710, base station 1720 and UE 1730 illustrated in FIG. 17 may be similar or identical to host computer 1630, one of base stations 1612a, 1612b, 1612c and one of UEs 1691, 1692 of FIG. 16, respectively. This is to say, the inner workings of these entities may be as shown in FIG. 17 and independently, the surrounding network topology may be that of FIG. 16.

In FIG. 17, OTT connection 1750 has been drawn abstractly to illustrate the communication between host computer 1710 and UE 1730 via base station 1720, without explicit reference to any intermediary devices and the precise routing of messages via these devices. Network infrastructure may determine the routing, which it may be configured to hide from UE 1730 or from the service provider operating host computer 1710, or both. While OTT connection 1750 is active, the network infrastructure may further take decisions by which it dynamically changes the routing (e.g., on the basis of load balancing consideration or reconfiguration of the network).

Wireless connection 1770 between UE 1730 and base station 1720 is in accordance with the teachings of the embodiments described throughout the present disclosure. One or more of the various embodiments improve the performance of OTT services provided to UE 1730 using OTT connection 1750, in which wireless connection 1770 forms the last segment. More precisely, the teachings of these embodiments may improve the efficiency of synchronization and thereby provide benefits such as allowing multiple operators to operate in the same unlicensed spectrum in the same location. When the frequency position of the SS/PBCH block is decoupled from the signaled values of K and $k_{SSB}$ in MIB, the SS/PBCH block may have less chance to collide with cells/base stations operating nearby. Thus, the embodiments of the present disclosure allow more efficient cell global identifier reporting.

A measurement procedure may be provided for the purpose of monitoring data rate, latency and other factors on which the one or more embodiments improve. There may further be an optional network functionality for reconfiguring OTT connection 1750 between host computer 1710 and UE 1730, in response to variations in the measurement results. The measurement procedure and/or the network functionality for reconfiguring OTT connection 1750 may be implemented in software 1711 and hardware 1715 of host computer 1710 or in software 1731 and hardware 1735 of UE 1730, or both. In embodiments, sensors (not shown) may be deployed in or in association with communication devices through which OTT connection 1750 passes; the sensors may participate in the measurement procedure by supplying values of the monitored quantities exemplified above, or supplying values of other physical quantities from which software 1711, 1731 may compute or estimate the monitored quantities.

The reconfiguring of OTT connection 1750 may include message format, retransmission settings, preferred routing etc.; the reconfiguring need not affect base station 1720, and it may be unknown or imperceptible to base station 1720. Such procedures and functionalities may be known and practiced in the art. In certain embodiments, measurements may involve proprietary UE signaling facilitating host computer 1710's measurements of throughput, propagation times, latency and the like. The measurements may be implemented in that software 1711 and 1731 causes messages to be transmitted, in particular empty or 'dummy' messages, using OTT connection 1750 while it monitors propagation times, errors etc.

Figure 18:
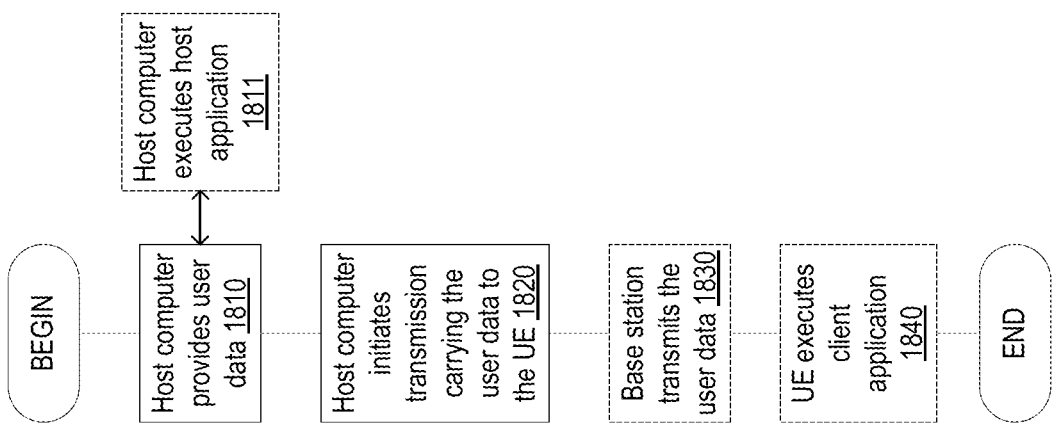
FIG. 18 illustrates methods implemented in a communication system including a host computer, a base station and a user equipment in accordance with some embodiments.

FIG. 18: Methods Implemented in a Communication System Including a Host Computer, a Base Station and a User Equipment in Accordance with Some Embodiments FIG. 18 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 18 will be included in this section. In step 1810, the host computer provides user data. In substep 1811 (which may be optional) of step 1810, the host computer provides the user data by executing a host application. In step 1820, the host computer initiates a transmission carrying the user data to the UE. In step 1830 (which may be optional), the base station transmits to the UE the user data which was carried in the transmission that the host computer initiated, in accordance with the teachings of the embodiments described throughout this disclosure. In step 1840 (which may also be optional), the UE executes a client application associated with the host application executed by the host computer.

Figure 19:
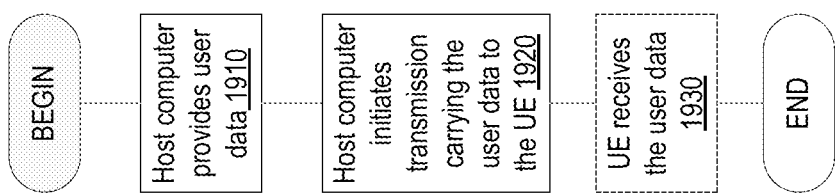
FIG. 19 illustrates methods implemented in a communication system including a host computer, a base station and a user equipment in accordance with some embodiments.

FIG. 19: Methods Implemented in a Communication System Including a Host Computer, a Base Station and a User Equipment in Accordance with Some Embodiments FIG. 19 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 19 will be included in this section. In step 1910 of the method, the host computer provides user data. In an optional substep (not shown) the host computer provides the user data by executing a host application. In step 1920, the host computer initiates a transmission carrying the user data to the UE. The transmission may pass via the base station, in accordance with the teachings of the embodiments described throughout this disclosure. In step 1930 (which may be optional), the UE receives the user data carried in the transmission.

Figure 20:
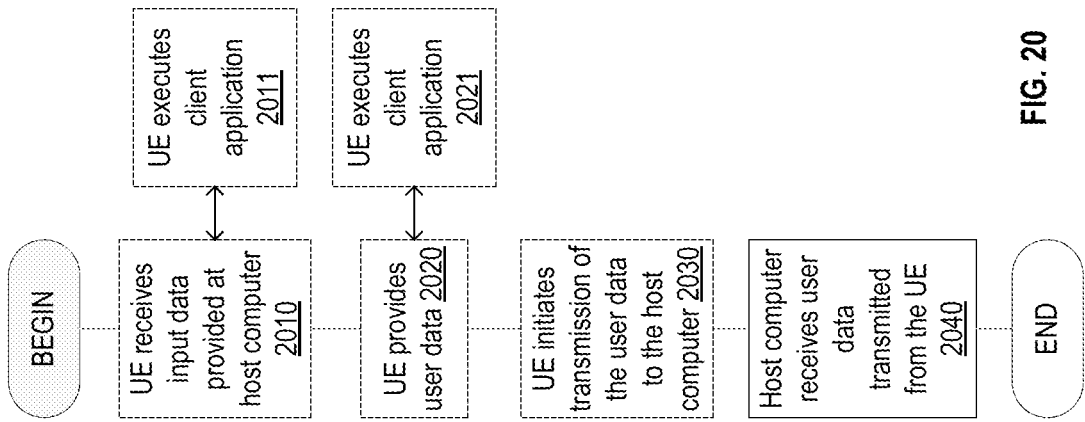
FIG. 20 illustrates methods implemented in a communication system including a host computer, a base station and a user equipment in accordance with some embodiments.

FIG. 20: Methods Implemented in a Communication System Including a Host Computer, a Base Station and a User Equipment in Accordance with Some Embodiments FIG. 20 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 20 will be included in this section. In step 2010 (which may be optional), the UE receives input data provided by the host computer. Additionally or alternatively, in step 2020, the UE provides user data. In substep 2021 (which may be optional) of step 2020, the UE provides the user data by executing a client application. In substep 2011 (which may be optional) of step 2010, the UE executes a client application which provides the user data in reaction to the received input data provided by the host computer. In providing the user data, the executed client application may further consider user input received from the user. Regardless of the specific manner in which the user data was provided, the UE initiates, in substep 2030 (which may be optional), transmission of the user data to the host computer. In step 2040 of the method, the host computer receives the user data transmitted from the UE, in accordance with the teachings of the embodiments described throughout this disclosure.

Figure 21:
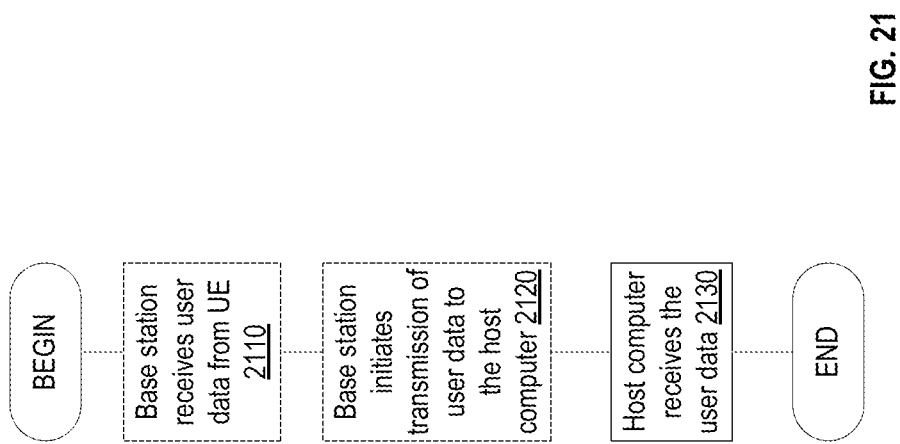
FIG. 21 illustrates methods implemented in a communication system including a host computer, a base station and a user equipment in accordance with some embodiments.

FIG. 21: Methods Implemented in a Communication System Including a Host Computer, a Base Station and a User Equipment in Accordance with Some Embodiments FIG. 21 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 21 will be included in this section. In step 2110 (which may be optional), in accordance with the teachings of the embodiments described throughout this disclosure, the base station receives user data from the UE. In step 2120 (which may be optional), the base station initiates transmission of the received user data to the host computer. In step 2130 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 22:
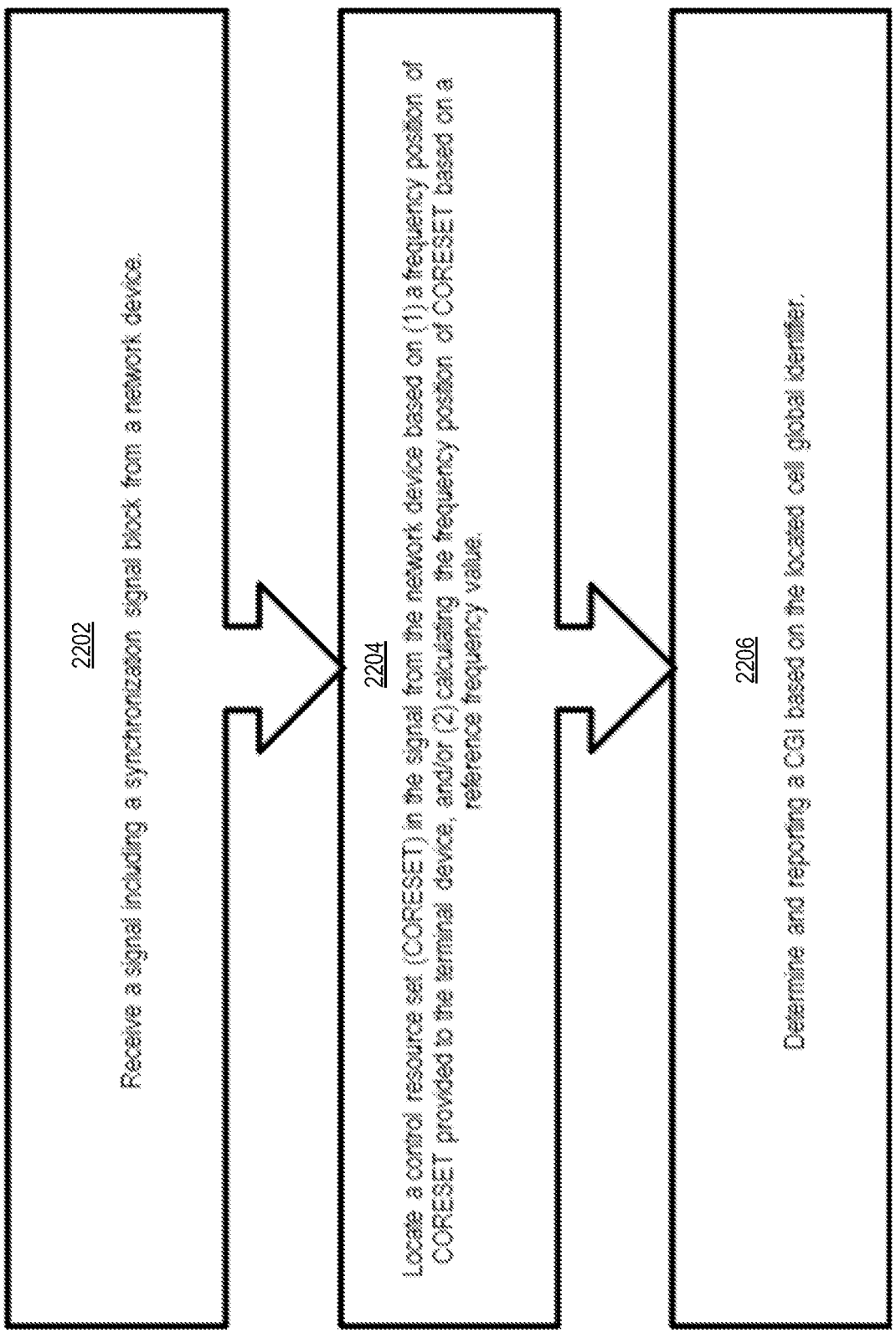
FIG. 22 illustrates a method in accordance with some embodiments.

FIG. 22: Method in Accordance with Some Embodiment

FIG. 22 depicts a method implemented in a terminal device (e.g., a UE) in accordance with particular embodiments, the method begins at step 2202 with receiving a signal including a synchronization signal block from a network device. The signal may be received from a neighbor cell as discussed herein above. At step 2204, the method continues with locating a control resource set (CORESET) in the signal from the network device based on (1) a frequency position of CORESET provided to the terminal device, and/or (2) calculating the frequency position of CORESET based on a reference frequency value. The location of the CORESET is discussed in more details herein above relating to Procedures A to C above. At step 2206, the method continues at determining and reporting a CGI based on the located CORESET as discussed herein above. The reported CGI will be transmitted to the serving cell of the terminal device.

Figure 23:
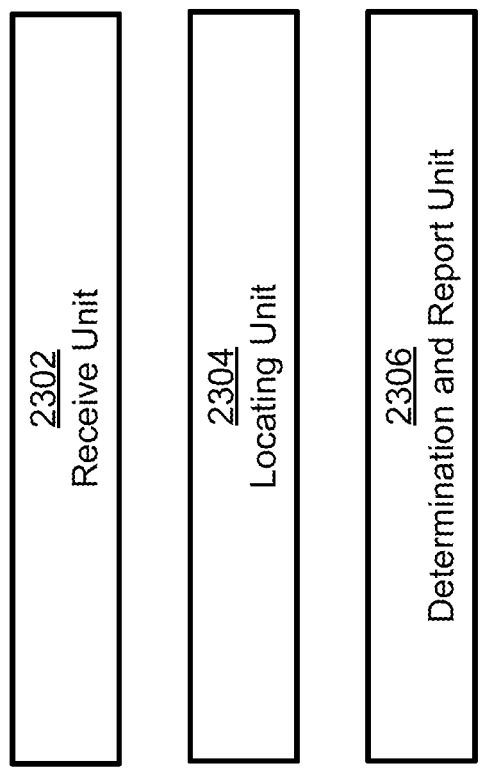
FIG. 23 illustrates virtualization apparatus in accordance with some embodiments.

FIG. 23: Virtualization Apparatus in Accordance with Some Embodiments

FIG. 23 illustrates a schematic block diagram of an apparatus 2300 in a wireless network (for example, the wireless network shown in FIG. 13). The apparatus may be implemented in a wireless device or network node (e.g., wireless device 1310 or network node 1360 shown in FIG. 13). Apparatus 2300 is operable to carry out the example method described with reference to FIG. 22 and possibly any other processes or methods disclosed herein. It is also to be understood that the method of FIG. 22 is not necessarily carried out solely by apparatus 2300. At least some operations of the method can be performed by one or more other entities.

Virtual Apparatus 2300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receive unit 2302, locating unit 2304, and determination and reporting unit 236, and any other suitable units of apparatus 2300 to perform corresponding functions according one or more embodiments of the present disclosure.

As illustrated in FIG. 23, apparatus 2300 includes receive unit 2302, locating unit 2304, and determination and reporting unit 2304. These units may be configured to perform operations in FIG. 22.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EMBODIMENTS

Group A Embodiments

1. A method performed by a terminal device for cell global identifier (CGI) measurement in a wireless network, the method comprising:
receiving a signal including a synchronization signal block from a network device;
locating a control resource set (CORESET) in the signal from the network device based on (1) a
frequency position of the CORESET provided to the terminal device, and/or (2)
calculating the frequency position of CORESET based on a reference frequency value; determining and reporting a CGI based on the located CORESET.
2. The method of embodiment 1, wherein the frequency position of the CORESET is determined based on a frequency reference or a frequency reference offset.
3. The method of embodiment 1, wherein the frequency position of the CORESET is provided in a measurement object information element (IE).
4. The method of embodiment 1, wherein the frequency position of the CORESET is determined based on the synchronization signal block in the signal.
5. The method of embodiment 1, wherein the frequency position of the CORSET is indicated from a signal transmitted from a serving network device.
6. The method of embodiment 1, wherein the reference frequency value indicates a frequency offset.
7. The method of embodiment 1, wherein the frequency position of the synchronization signal block is obtained, wherein the synchronization signal block is to determine a configuration of a PDCCH search space associated with the CORSET.
8. The method of embodiment 7, the PDSCH carries a system information block (SIB), through which the cell global identifier (CGI) is obtained.

Group B Embodiments

9. A method performed by a network node for cell global identifier (CGI) measurement in an unlicensed spectrum, wherein a plurality of wireless networks operates in the unlicensed spectrum, the method comprising:
determining a first frequency position of synchronization signal blocks for a first wireless network,
determining a second frequency position of synchronization signal blocks for a second wireless network, wherein the second frequency position is different from the first frequency position,
causing the first and second frequency positions of synchronization signal blocks to be transmitted to a first and a second terminal device respectively, wherein the frequency positions of the synchronization signal blocks are used to determine a cell global identifier (CGI).
10. A method performed by a base station for cell global identifier (CGI) measurement in a wireless network, the method comprising:
providing a frequency position of a control resource set (CORESET) and/or a reference frequency value to for a terminal device to determine the frequency position of the CORSET to the terminal device; and
obtaining a cell global identifier (CGI) from the terminal device.

Group C Embodiments

11. A wireless device for cell global identifier (CGI) measurement, the wireless device comprising:
processing circuitry configured to perform any of the steps of any of the Group A embodiments; and
power supply circuitry configured to supply power to the wireless device.
12. A base station for cell global identifier (CGI) measurement, the base station comprising:
processing circuitry configured to perform any of the steps of any of the Group B embodiments;
power supply circuitry configured to supply power to the wireless device.
13. A user equipment (UE) for cell global identifier (CGI) measurement, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and a battery connected to the processing circuitry and configured to supply power to the UE.

14. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform any of the steps of any of the Group B embodiments.

15. The communication system of the previous embodiment further including the base station.

16. The communication system of the previous 2 embodiments, further including the UE, wherein the UE is configured to communicate with the base station.

17. The communication system of the previous 3 embodiments, wherein:
   the processing circuitry of the host computer is configured to execute a host application, thereby providing the user data; and
   the UE comprises processing circuitry configured to execute a client application associated with the host application.

18. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs any of the steps of any of the Group B embodiments.

19. The method of the previous embodiment, further comprising, at the base station, transmitting the user data.

20. The method of the previous 2 embodiments, wherein the user data is provided at the host computer by executing a host application, the method further comprising, at the UE, executing a client application associated with the host application.

21. A user equipment (UE) configured to communicate with a base station, the UE comprising a radio interface and processing circuitry configured to performs the of the previous 3 embodiments.

22. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's components configured to perform any of the steps of any of the Group A embodiments.

23. The communication system of the previous embodiment, wherein the cellular network further includes a base station configured to communicate with the UE.

24. The communication system of the previous 2 embodiments, wherein:
   the processing circuitry of the host computer is configured to execute a host application, thereby providing the user data; and
   the UE's processing circuitry is configured to execute a client application associated with the host application.

25. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs any of the steps of any of the Group A embodiments.

26. The method of the previous embodiment, further comprising at the UE, receiving the user data from the base station.

27. A communication system including a host computer comprising:
   communication interface configured to receive user data originating from a transmission from a user equipment (UE) to a base station,
   wherein the UE comprises a radio interface and processing circuitry, the UE's processing circuitry configured to perform any of the steps of any of the Group A embodiments.

28. The communication system of the previous embodiment, further including the UE.

29. The communication system of the previous 2 embodiments, further including the base station, wherein the base station comprises a radio interface configured to communicate with the UE and a communication interface configured to forward to the host computer the user data carried by a transmission from the UE to the base station.

30. The communication system of the previous 3 embodiments, wherein:
   the processing circuitry of the host computer is configured to execute a host application; and
   the UE's processing circuitry is configured to execute a client application associated with the host application, thereby providing the user data.

31. The communication system of the previous 4 embodiments, wherein:
   the processing circuitry of the host computer is configured to execute a host application, thereby providing request data; and
   the UE's processing circuitry is configured to execute a client application associated with the host application, thereby providing the user data in response to the request data.

32. A method implemented in a communication system including a host computer, a base station and a user equipment (UE), the method comprising:
   at the host computer, receiving user data transmitted to the base station from the UE, wherein the UE performs any of the steps of any of the Group A embodiments.

33. The method of the previous embodiment, further comprising, at the UE, providing the user data to the base station.

34. The method of the previous 2 embodiments, further comprising:
   at the UE, executing a client application, thereby providing the user data to be transmitted; and
   at the host computer, executing a host application associated with the client application.

35. The method of the previous 3 embodiments, further comprising:
   at the UE, executing a client application; and
   at the UE, receiving input data to the client application, the input data being provided at the host computer by executing a host application associated with the client application,
   wherein the user data to be transmitted is provided by the client application in response to the input data.

36. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

37. The communication system of the previous embodiment further including the base station.

38. The communication system of the previous 2 embodiments, further including the UE, wherein the UE is configured to communicate with the base station.

39. The communication system of the previous 3 embodiments, wherein:
the processing circuitry of the host computer is configured to execute a host application;
the UE is configured to execute a client application associated with the host application, thereby providing the user data to be received by the host computer.

40. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

41. The method of the previous embodiment, further comprising at the base station, receiving the user data from the UE.

42. The method of the previous 2 embodiments, further comprising at the base station, initiating a transmission of the received user data to the host computer.

What is claimed is:

1. A method implemented in a wireless device for reporting of a cell global identifier (CGI) in a wireless network, the method comprising:
receiving a synchronization signal/physical broadcast channel (SS/PBCH) block from a network node;
locating a control resource set (CORESET) configured by the network node through determining a frequency position of the CORESET based on a value received from the network node through radio resource control signaling; and
determining and reporting the CGI to the network node based on the located CORESET, wherein determining and reporting a CGI based on the located CORESET further comprises:
decoding a physical downlink control channel in a search space associated with the CORESET; and
reading a system information block to determine the CGI.

2. The method of claim 1, wherein the value indicates a frequency offset between the CORESET and the SS/PBCH block, wherein the frequency position of the CORESET is determined based on a subtraction of the frequency offset from the frequency position of the SS/PBCH block.

3. The method of claim 1, wherein the value directly indicates the frequency position of the CORESET.

4. The method of claim 1, wherein the value indicates a reference frequency of a resource block boundary, and the frequency position of the CORESET is determined based on an offset, provided by a master information block (MIB) contained in the received SS/PBCH block, indicating a physical resource block offset between the reference frequency and a frequency of a lowest indexed subcarrier of the CORESET.

5. The method of claim 1, wherein the value indicates a reference frequency offset between a first and second resource block boundary, and the frequency position of the CORESET is determined based on:
the value,
a first offset indicating a physical resource block offset between the first resource block boundary and a lowest indexed subcarrier of the CORESET, and
a second offset indicating a difference between the second resource block boundary and a lowest indexed subcarrier of the SS/PBCH block,
the first and second offsets being provided by a master information block (MIB) contained in the received SS/PBCH block.

6. The method of claim 1, wherein the value indicates one of a reference frequency or a reference frequency offset, wherein the reference frequency is the frequency location of a hypothetically transmitted SS/PBCH block and the reference frequency offset is the frequency offset between the hypothetically transmitted SS/PBCH block and the received SS/PBCH block, and the frequency position of the CORESET is determined based on:
a first offset indicating a physical resource block offset between a resource block boundary and a lowest indexed subcarrier of the CORESET, and
a second offset indicating a difference between the resource block boundary and a lowest indexed subcarrier of the hypothetically transmitted SS/PBCH block,
the first and second offsets being provided by a master information block (MIB) contained in the received SS/PBCH block.

7. The method of claim 1, wherein the value is provided in a report configuration information element (IE) received from the network node.

8. The method of claim 1, wherein the value is provided in a measurement object information element (IE) received from the network node.

9. The method of claim 1, wherein the value indicates a new radio absolute radio frequency channel number (ARFCN), a global synchronization channel number (GSCN), or a frequency expressed in Hz.

10. The method of claim 1, wherein the value indicates a number of subcarriers, a number of resource blocks, or a number of physical resource blocks.

11. A method implemented in a wireless device for reporting of a cell global identifier (CGI) in a wireless network, the method comprising:
receiving a synchronization signal/physical broadcast channel (SS/PBCH) block from a network node;
locating a control resource set (CORESET) configured by the network node through testing a set of one or more reference frequency candidates from which a frequency position of the CORESET is determined; and
determining and reporting a CGI to the network node based on the located CORESET, wherein determining and reporting the CGI based on the located CORESET further comprises reading a system information block to determine the CGI.

12. The method of claim 11, wherein the set of one or more reference frequency candidates comprises a set of synchronization raster frequencies that are within a threshold amount away from the frequency position of the SS/PBCH block.

13. The method of claim 11, wherein the set of one or more reference frequency candidates comprises a synchronization raster frequency within the same sub-band or channel as the frequency location of the SS/PBCH block.

14. The method of claim 11, wherein the set of one or more reference frequency candidates comprises a set of synchronization raster frequencies within the same sub-band or channel as the frequency location of the SS/PBCH block.

15. The method of claim 11, wherein the number of reference frequency candidates in the set depends on the bandwidth of another network node, an identity of which is reported as the CGI.

16. The method of claim 11, wherein a reference frequency candidate corresponds to the frequency of a resource block boundary, and the frequency position of the CORESET is determined based on an offset, provided by a master information block (MIB) contained in the received SS/PBCH block, indicating a physical resource block offset between the resource block boundary and the frequency of a lowest indexed subcarrier of the CORESET.

17. The method of claim 11, wherein a reference frequency candidate corresponds to the frequency location of a hypothetically transmitted SS/PBCH block, and the frequency position of the CORESET is determined based on:
  a first offset indicating a physical resource block offset between a resource block boundary and a lowest indexed subcarrier of the CORESET, and
  a second offset indicating a difference between the resource block boundary and a lowest indexed subcarrier of the hypothetically transmitted SS/PBCH block,
  the first and second offsets being provided by a master information block (MIB) contained in the received SS/PBCH block.

18. The method of claim 11, wherein testing the set of one or more reference frequency candidates comprises:
  selecting a reference frequency candidate from the set;
  determining a hypothesized frequency position of the CORESET based on the reference frequency candidate;
  decoding a physical downlink control channel in a search space associated with the CORESET based on the hypothesized frequency position of the CORESET; and
  confirming the hypothesized frequency position when the decoded physical downlink control channel passes an error detection check, and rejecting the hypothesized frequency position and selecting another reference frequency candidate from the set to test otherwise.

19. A wireless device to report a cell global identifier (CGI) in a wireless network, the wireless device comprising:
  processing circuitry and device readable medium coupled to the processing circuitry, wherein the device readable medium stores instructions, which when executed, are capable of causing the wireless device to perform:
    receiving a synchronization signal/physical broadcast channel (SS/PBCH) block from a network node;
    locating a control resource set (CORESET) configured by the network node through determining a frequency position of the CORESET based on a value received from the network node through radio resource control signaling; and
    determining and reporting the CGI to the network node based on the located CORESET, wherein determining and reporting a CGI based on the located CORESET further comprises:
      decoding a physical downlink control channel in a search space associated with the CORESET; and
      reading a system information block to determine the CGI.

20. The wireless device of claim 19, wherein the value indicates a frequency offset between the CORESET and the SS/PBCH block, wherein the frequency position of the CORESET is determined based on a subtraction of the frequency offset from the frequency position of the SS/PBCH block.

21. The wireless device of claim 19, wherein the value directly indicates the frequency position of the CORESET.

22. The wireless device of claim 19, wherein the value indicates a reference frequency of a resource block boundary, and the frequency position of the CORESET is determined based on an offset, provided by a master information block (MIB) contained in the received SS/PBCH block, indicating a physical resource block offset between the reference frequency and a frequency of a lowest indexed subcarrier of the CORESET.

23. The wireless device of claim 19, wherein the value indicates a reference frequency offset between a first and second resource block boundary, and the frequency position of the CORESET is determined based on:
  the value,
  a first offset indicating a physical resource block offset between the first resource block boundary and a lowest indexed subcarrier of the CORESET, and
  a second offset indicating a difference between the second resource block boundary and a lowest indexed subcarrier of the SS/PBCH block,
  the first and second offsets being provided by a master information block (MIB) contained in the received SS/PBCH block.

24. The wireless device of claim 19, wherein the value indicates one of a reference frequency or a reference frequency offset, wherein the reference frequency is the frequency location of a hypothetically transmitted SS/PBCH block and the reference frequency offset is the frequency offset between the hypothetically transmitted SS/PBCH block and the received SS/PBCH block, and the frequency position of the CORESET is determined based on:
  a first offset indicating a physical resource block offset between a resource block boundary and a lowest indexed subcarrier of the CORESET, and
  a second offset indicating a difference between the resource block boundary and a lowest indexed subcarrier of the hypothetically transmitted SS/PBCH block,
  the first and second offsets being provided by a master information block (MIB) contained in the received SS/PBCH block.

25. A wireless device to report a cell global identifier (CGI) in a wireless network, the wireless device comprising:
  processing circuitry and device readable medium coupled to the processing circuitry, wherein the device readable medium stores instructions, which when executed, are capable of causing the wireless device to perform:
    receiving a synchronization signal/physical broadcast channel (SS/PBCH) block from a network node;
    locating a control resource set (CORESET) configured by the network node through testing a set of one or more reference frequency candidates from which a frequency position of the CORESET is determined; and
    determining and reporting a CGI to the network node based on the located CORESET, wherein determining and reporting the CGI based on the located CORESET further comprises reading a system information block to determine the CGI.

26. The wireless device of claim 25, wherein the set of one or more reference frequency candidates comprises a set of synchronization raster frequencies that are within a threshold amount away from the frequency position of the SS/PBCH block.

27. The wireless device of claim 25, wherein the set of one or more reference frequency candidates comprises a synchronization raster frequency within the same sub-band or channel as the frequency location of the SS/PBCH block.

28. The wireless device of claim 25, wherein the set of one or more reference frequency candidates comprises a set of synchronization raster frequencies within the same sub-band or channel as the frequency location of the SS/PBCH block.

* * * * *